United States Patent [19]

Hildebrandt

[11] Patent Number: 5,535,390
[45] Date of Patent: Jul. 9, 1996

[54] METHOD FOR REUSING TEMPORARIES AND RECLAIMING SHARED MEMORY

[76] Inventor: Thomas H. Hildebrandt, 1704 Sequoia Ct., Allentown, Pa. 18104-1718

[21] Appl. No.: 279,466

[22] Filed: Jul. 22, 1994

[51] Int. Cl.$^6$ ........................................... G06F 9/45
[52] U.S. Cl. ...................... 395/700; 364/DIG. 1; 364/281.1; 395/481
[58] Field of Search ................................ 395/700

[56] References Cited

U.S. PATENT DOCUMENTS 5,249,231  9/1993  Covey et al. ............................. 380/25
5,355,482  10/1994  Serlet ...................................... 395/650

OTHER PUBLICATIONS

Adams, Robert, "Temporary Object Management through Dual Classes", The C Users Journal, May 1994, vol. 12, No. 5, pp. 27–31, 34, 35.
Saks, Dan, "Stepping Up to C++: Temporary Inconvenience, Part 1", The C Users Journal, Oct. 1993, vol. 11, No. 10, pp. 103–110.
Saks, Dan, "Designing Generic Container Classes, Part I", The C Users Journal, Jun. 1994, vol. 12, No. 6, pp. 61, 62, 66–74.
Hildebrandt, Thomas H, "How To Avoid Copying in assignment operations: a class based approach", Journal of object oriented prog. pp. 25–29 Sep. 1993.
Schnorf, Peter et al, "Compile time copy elimination", Software—Practice and Experience pp. 1135–1200 Nov. 1993.
Ferreira et al. "Reclaiming Storage in an Object Oriented Platform Supporting Extended C++" 1991 Int. Workshop.
Corporal et al. "The Design Space of Garbage Collection" Compevro 1991.
Carlini et al. "Garbage Collection for C programs" Dr Dobbs—Journal Nov. 1992 V 17 n 11 p. 46 (5).
Stump et al. "Garbage Collection in C++" Exe (journal) Apr. 1993 v 7 n 10 p. 54 (4).
Gupta et al. "Reliable Garbage Collection in Distributed Object Oriented Systems" Computer Software Conf. 1988.
Corporaal et al. "An efficient Reference Weight-based Garbage Collection Method for Distributed Systems" Parbase 1990.
Foster, Ian et al. "Copy avoidance through compile–time analysis and local reuse, Logic Programming", Proc. of the 1991 Int Symp. pp. 455–469 (1991).
Glaser, Hugh et al, "An analysis of reference count garbage collection, Schemes for declarative languages" Proc. Int. Comp. Sci 1988. pp. 641–648.
Gopinath K et al, "Copy elimination in functional lang." pp. 303–314 (1989) Conference record of the 16th Annual ACM Symp.
Hartel, P. "A comparison of three garbage collection algorithms" Structured Programming 11, pp. 117–127 (1990).

*Primary Examiner*—Kevin A. Kriess
*Assistant Examiner*—St. John Courtenay, III
*Attorney, Agent, or Firm*—Shoemaker and Mattare, Ltd.

[57] ABSTRACT

Methods for shared memory reclamation and local reuse and their combination, and methods for transforming function definitions in an object-oriented programming environment such that said shared memory reclamation and local reuse methods are implemented in source code and require no additional memory or CPU resources at run time. Each method causes a subtype field to be attached to every object, thus enabling decisions as to whether the memory referenced by an object can be deallocated or reallocated. The subtype field further supports the elimination of trivial deep copies and the implementation of value semantics.

17 Claims, 23 Drawing Sheets

| ARG 1 | ARG 2 | ... | ARG N |

Fig. 2A (Prior Art)

| ARG 1 | ARG 2 | ... | ARG N | TMP 1 | TMP 2 | ... | TMP M |

Fig. 2B (Prior Art)

| RET | ARG 1 | ARG 2 | ... | ARG N |

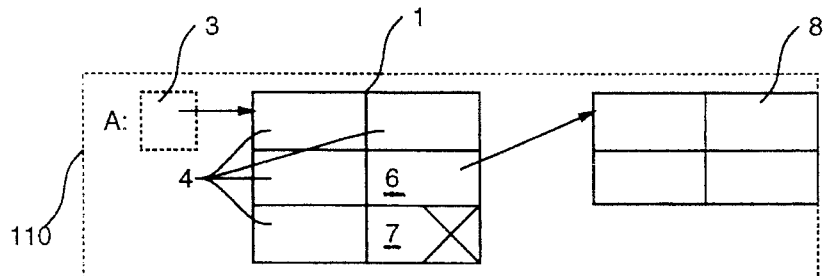
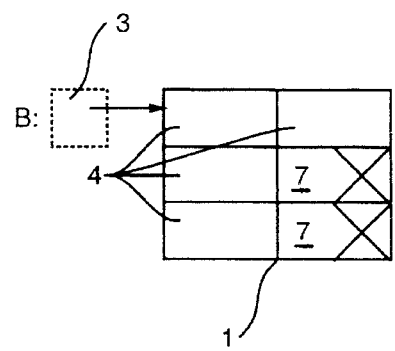
Fig. 7A (Prior Art)
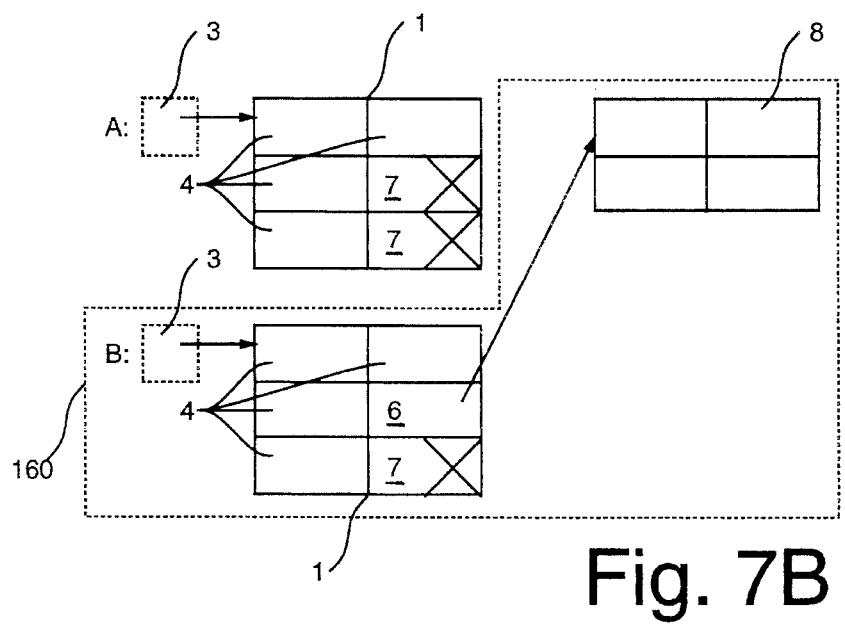
Fig. 7B (Prior Art)

METHOD FOR REUSING TEMPORARIES AND RECLAIMING SHARED MEMORY

1. FIELD OF THE INVENTION

This invention relates to the allocation and deallocation of memory for data storage. More particularly, garbage collection and local reuse of memory and additionally the combination of these two techniques.

2. BACKGROUND

Information processing applications require the manipulation of data objects. The manipulation of these objects consumes information processing resources including memory and processor time. Provision of these resources is costly. It is therefore desirable to employ methods which reduce the quantity of information processing resources required to accomplish a given manipulation.

In particular, the manipulation of data objects often requires the allocation and deallocation of memory intended to hold temporary and return values. The allocation and deallocation operations themselves require processor time, and memory remains in use between a successful allocation and its corresponding deallocation. It is therefore desirable to reduce the number of allocations and deallocations required by a given manipulation. This will in turn reduce the total amount of information processing resources used.

In the past, two main methods have been used to reduce run-time memory requirements: copy-by-reference and local reuse. Unfortunately, prior methods employing copy-by-reference require garbage collection procedures which are expensive in terms of CPU resources at run time. Existing local reuse methods require that the language used guarantees that every data object has at most one reader. Furthermore, a successful synthesis of these two methods has not previously been achieved.

The method of the present invention represents a novel synthesis of these two existing methods wherein copy-by-reference can be achieved without requiring expensive run-time garbage collection, and local reuse can be employed in connection with a declarative language. Because this method relies upon the concept of a subtype field, which in itself is entirely new, it can be seen that this method is at once innovative and non-obvious.

In the following subsection, the terms used in the present discussion are defined. Subsection 2.2 then briefly presents the known methods, for comparison and contrast with the present method.

2.1 Definitions
2.1.1 Applications

Information processing applications are programs or sets of programs which are executed on one or more computers 200. A computer consists of a central processing unit (CPU) 230 and memory 220, as well as various arithmetic, logical, and input/output (I/O) devices. After a program has been stored as machine instructions in memory 220, it can be executed by the CPU 230. The CPU 230 reads and executes the stored instructions one-by-one in sequence. When such a sequence is being executed, it is called a process 250. Computers usually contain memory management hardware and/or software 240 which controls the allocation and deallocation of blocks of memory 220 for specific processes 250. The CPU 230 communications with memory 220, the memory manager 240 and processes 250 through messages 260 passed between them.

Information processing applications are commonly specified using a computer language. A translator is then used to convert this specification into a form which can be executed by the target machine. The translator can be either an interpreter or a compiler: An interpreter translates the source code statement-by-statement while executing a program; a compiler translates the entire program before execution begins. For efficiency reasons, compilers are used most often. Compilers are able to effect optimizations which reduce the computational resources required by an application. Manipulations which are performed by the compiler are said to be done at compile time, while manipulations performed during execution of the application are said to be done at run time.

Programming languages can be split into two groups: functional and declarative: Functional languages do not include data structure declarations, whereas declarative languages do. Functional languages are mainly of academic interest, while the great majority of applications are coded using declarative languages.

An information processing application coded in a declarative language includes data declarations and function invocations. Most languages also include facilities for data structure definitions and function definitions. Data structure definitions define aggregations of data which are to be manipulated as a unit. Function definitions consist of a sequence of data structure declarations and function invocations. Execution of a data declaration causes the creation of a data structure. Execution of a function invocation causes the corresponding function definition to be executed.

2.1.2 Objects

In the object-oriented programming paradigm, a data structure is called an object, and data structure definitions are called classes or types. A type specification includes a list of all of the functions which can be used to manipulate an object of that type. Thus, object-oriented programming provides for the direct implementation of an abstract data type (ADT). Although the preferred embodiment of the present invention makes use of specific capabilities of object-oriented programming languages, it is more generally applicable. Henceforth, the term object is to be construed in its most general sense, i.e. "an instance of a data structure".

An object comprises two types of field: items and pointers. A pointer is the address of another memory location; an item is an object or data of a fundamental (non-pointer) type. Since data of a fundamental type can be considered to be an object, the terms "item" and "object" are used interchangeably.

In a well-behaved program, a pointer is either a reference to an object or has the special value nil. A pointer whose value is nil is called a null pointer. Application of a dereferencing operation to a pointer returns the object referenced or pointed to. The result of applying a dereferencing operation to a null pointer is undefined.

In general, an object 1 as shown in FIG. 1 is comprised of a type field 2, zero or more items 4, and zero or more pointers (6 and 7). Because the information contained in the type field is commonly used only at compile time, it is not necessarily stored with the object at run time. The type field is therefore drawn within a dashed box to distinguish it from information comprising the object which must be stored at run time. In the figure, nonnull pointers 6 are represented as arrows pointing to other objects 8. Null pointers 7 are represented by an X within the corresponding pointer field. Items 4 contained by an object are known as internal objects, while objects 8 referenced by pointers contained by an object are known as external objects.

An object 1 also has zero or more names 3 associated with it. Each name is a labelled pointer to the object. Since names are used only by the compiler at compile time, they do not require any storage at run time. This fact is represented by the use of dashed boxes to enclose the name pointers.

Note that external objects can also contain pointers to other objects recursively, creating an object with arbitrary "depth". The depth of an object can be determined by counting the number of pointers that must be followed to reach it, starting from a name. Thus in the figure, names 3 are at depth 0, the object 1 itself is at depth 1, and the external objects 8 are at depth 2. For consistency, the depth attributed to the manipulation of a pointer corresponds to the depth at which that pointer is stored. Thus, manipulations of pointers 6 as shown in FIG. 1 are considered to be at depth 1.

Since objects comprise data, memory resources must be allocated to store them. If the memory required to hold an object can be allocated before the information processing application begins execution, then it is said that memory for the object is allocated at compile time. Otherwise, memory for the object is allocated at run time. An object whose memory is allocated at run time is said to be dynamically allocated.

2.1.3 Functions

A function is the definition of a manipulation involving zero or more objects. These objects are called operands. At run time, a function modifies zero or more of its operands, using the information present in its operands. For the purposes of this discussion, global or static memory referenced by a function is considered to be an operand of that function.

Some functions have associated with them a special operand called a return value. Such functions are called operations. Functions which are not operations are called procedures. All operands of a function which are not the return value are called arguments. If a function is not permitted to modify an argument, then that argument is called a constant argument. Any argument not declared to be constant may be modified by the function. An operation may always modify the return value, if present.

In addition to reading and modifying their operands, functions can create and destroy objects called temporaries. These temporaries are necessarily dynamically allocated. The return values of operations are also commonly dynamically allocated, and the operands of a function can be dynamically allocated as well. Objects which are dynamically allocated by a function are allocated and deallocated each time the function is executed. This means, among other things, that temporaries must be deallocated before the function is exited.

Taken together, the objects which a function can access during its operation are called its local store. When a function begins execution, all of the arguments are in the local store, as shown in FIG. 2(*a*). As execution of the function progresses, temporaries may be added and removed. Thus, at any given time, there will also be a set of zero or more temporaries in the local store (FIG. 2(*b*)). Just before the function is exited, all temporaries are removed from the local store and deallocated, but a return value may remain (FIG. 2(*c*)).

A function definition consists of a header and a body. The header contains the name of the function and a list of formal parameters. The formal parameters identify the type of each operand including the return value, and provide a means for binding objects of the same name within the function body to the corresponding actual parameters in the function invocation. Some formal parameter lists include ellipsis, meaning that an unspecified number of parameters follow. In this case, the function must determine the types of the additional operands by other means.

The body of a function contains a list of data declarations and function invocations. Objects which are declared within a function definition can be accessed only within that function body. Said function body is said to be the scope of such an object. Objects declared in a function which invokes the present function can be accessed as actual parameters though bindings with this function's formal parameters. Objects in the calling (invoking) function are said to be in an enclosing scope.

2.1.4 Object-Oriented Languages

Object-oriented programming languages directly support the implementation of abstract data types (ADTs) by allowing a list of legal functions to be specified in conjunction with a type specification. Functions which operate implicitly on an object of that type are called member functions, and the object thus operated upon is called the target of the member function. Member functions which modify the target are called destructive functions. Member functions which do not modify the target are called nondestructive functions. It is also possible to specify non-member functions which access objects of that type explicitly.

Object-oriented languages provide in their syntax for special member functions to be applied in allocating and deallocating objects. These are called constructors and destructors, respectively. A type specification may contain many constructors, but has only one destructor. Most object-oriented languages automatically call the destructors of objects whenever the scope in which they are defined is exited.

Such languages also permit a given function to be multiply declared and defined, provided that any version of a function can be distinguished from all others according to the types of its operands. This is known as function overloading. When the compiler for such a language is presented with the invocation of a function, it selects the correct function definition by first identifying the family of functions having the same name. It then matches up the types of the actual parameters in the function invocation with those of the formal parameters in the function definitions. If there is exactly one match, it selects that one function as the correct match. Otherwise, a compiler error is generated.

In addition to providing for the implementation of abstract data types, most object-oriented programming languages provide for inheritance. Inheritance allows most of a type specification (and the corresponding function definitions) to be shared among different types. Specifically, a derived type inherits its basic behavior from its parent type. It then suffices to specify how the behavior of the derived type differs from that of its parent.

In most implementations, inheritance also gives rise to an intentional ambiguity in the resolution of operand types. Specifically, if there is no function definition which matches the type of an operand exactly, then the compiler attempts to find a match with each of the operand type's ancestors in turn. If there is exactly one best match, then the compiler selects this one as the correct function definition. Otherwise, a compiler error is generated. This mechanism supports the definition of a function which applies to an entire subtree of operand types. When a function accepts a parameter of any type within an inheritance subtree, this is known as polymorphism.

2.2 Existing Methods for Memory Reuse

The operative concept used to reduce the cost of dynamic allocation is to re-use objects which have already been allocated in preference to allocating new ones. The techniques which have been used can be summarized as copy-by-reference and direct reuse.

2.2.1 Copy-by-Reference

Information processing applications may involve the manipulation of multiple copies of the same object. The most economical way to copy a declared object is to create an alias for it. An alias is an additional name 3 which refers to the same object 1. The example of FIG. 3 shows an object 1 which has the aliases "A" and "B". This is the simplest form of copy-by-reference.

It is possible to extend the copy-by-reference scheme to the case in which there are distinct objects containing pointers, one of which is to be given the same value as the other. In this case, the internal fields 4, 6 and 7 are copied verbatim from one to the other. Any nonnull pointers in the second object then point to the same external objects as are pointed to by those in the first. This is known as a shallow copy between two objects. An example of the result of a shallow copy is shown in FIG. 4. In FIG. 4, it is obvious that the external object 8 has been copied into the second object by reference.

There are two problems associated with shallow copies. The first is that even though the objects 1 are declared independently, modification of the external object 8 now affects both copies. Thus, objects which share external data can be termed virtual aliases. This behavior may be in contrast to what was intended. The second problem is that the external objects 8 are now jointly owned by all of the objects 1 referring to them, and no external object 8 can safely be deallocated until every reference 6 to it is destroyed.

Deep Copying

The first problem is solved by making provisions for a deep or verbatim copy. A deep copy is the same as a shallow copy, except that the external objects 8 are also copied verbatim. This involves the allocation of memory sufficient to hold each external object 8 referred to by the first object, and copying their contents. The nonnull pointers 6 in the second object are then set to point to the copies of the external objects 8 (as opposed to pointing to the originals). An example of the result of a deep copy is shown in FIG. 5. Note that a deep copy yields two data structures which are completely distinct (i.e. share no memory).

Since the definition of an object is recursive, it can be seen that there can be several levels of "depth" to a shallow copy. The present discussion treats only two levels, but the methods described here can easily be extended to multiple levels of reference.

Memory Reclamation

The second problem associated with copy-by-reference has been addressed by methods for memory reclamation or garbage collection. These methods deallocate an external object 8 only after all references 6 to it have been removed, thereby returning its memory to the free store for later use or use by other processes while ensuring that an existing reference copy always has access to it. Once a memory reclamation method is in place, it can be said that copy-by-reference is supported. Methods for memory reclamation include reference counting, mark-scan garbage collection, and the two-space copy[4].

The article by Corporaal and Veldman [1] provides an excellent taxonomy which classifies known memory reclamation methods according to six general descriptors.

Reference Counting

In reference counting[2], as diagrammed in FIG. 6, each external object 8 has associated with it a count 11 of the number of objects that reference (point to) it. Every time a new copy-by-reference is made to the external object 8, the count 11 is incremented, and every time an object which references it is destroyed, the count 11 is decremented. When the count 11 goes to zero, the object 8 (and its associated count 11) can be deallocated safely. However, the reference counting method requires additional resources for its implementation. The shared external data must contain the reference count—utilizing memory resources—and the count must be updated whenever a copy object is created or destroyed—utilizing CPU resources.

A variation of the reference counting scheme known as weighted reference counting removes the requirement of referencing shared memory, which makes such schemes amenable to parallel implementation, but some bookkeeping is still required at run time. Another variation known as lazy reference counting reduces the run-time CPU requirements by deferring deallocation operations and then combining them with allocations, but does not eliminate them entirely. Lazy reference counting is also inefficient in reclaiming unused memory. Run-time CPU resources are still required by all these methods. Both variations also require more memory for their implementation, in addition to the reference count. The fact that reference counting requires CPU resources at run-time has fostered interest in compile-time reallocation techniques.

Garbage Collection

One alternative method is called Mark-Scan garbage collection. In this scheme, external objects are never explicitly deallocated. Periodically, a garbage collection process marks all data blocks which can be accessed by any object. Unreferenced memory can be reclaimed by scanning the entire memory and deallocating unmarked elements.

Mark-scan garbage collection has two major drawbacks. One is that garbage collection is costly in terms of CPU usage (though not as costly as reference counting). The other is that on the average, half of the available memory is occupied by data blocks which could be reclaimed, so it is extremely costly in terms of unused memory. It is also necessary to set aside one bit of storage in each memory cell, in order to mark the cells as "used" during the marking step. This again is less expensive than reference counting.

Two-Space Copy garbage collection is similar to Mark-Scan garbage collection. However, instead of marking those items that can be reached by reference, all reachable data structures are periodically copied from one memory space into another. The first memory space can then be reclaimed in its entirety.

This method has the advantages that it avoids the problem of memory fragmentation and that the second memory space is only needed as the reclamation is being performed. It also eliminates the need for a "mark" bit in each memory cell. However, this method is just as expensive as mark-scan garbage collection in terms of CPU time. Both mark-scan and two-space copy require that all data structures remain unchanged during their execution, which prohibits running them in parallel with the application.

Whereas the memory reclamation methods discussed above permit the use of copy-by-reference, they are all expensive in terms of CPU usage. Thus, while copy-by-reference is useful in avoiding deep copies, in the current art it has an unavoidable CPU cost associated with it. In addition, only special cases of reference counting can be parallelized.

2.2.2 Direct Reuse

An approach which avoids the problems associated with copy-by-reference is to ensure that every reachable object has exactly one reference to it. A language which enforces this restriction is called a functional or single-assignment language, to contrast it with more general declarative languages. Since functional languages disallow multiple references, an object can be deallocated as soon as the one and only reference to it is deleted. There are no other references to be concerned about. Indeed, all such deallocations can be scheduled at compile time. Thus for functional languages, no run-time resources need be involved in reclaiming memory.

Unfortunately, the use of functional languages forces the proliferation of deep copies. Since deep copies are expensive in terms of both memory and CPU resources, it is desirable to avoid them whenever possible. Therefore, merely abandoning shallow copies in favor of deep copies is not regarded as an acceptable alternative. The techniques of local reuse and targeting have been developed in conjunction with functional languages, and have succeeded in bringing their performance up to a level which is comparable with the more conventional declarative languages[6].

Local Reuse

Local reuse[1, 3, 6] (also termed update-in-place) has been applied to functional languages, and involves a compile-time analysis of the source code to determine when an object with only a single reader can be reused. In this case, this object's memory may be reused by the function which reads it.

Local reuse involves the transfer of memory from one object to another as diagrammed in FIG. 7. FIG. 7(a) shows an object A which owns some external memory and an object B which does not. Memory is transferred from A to B by copying one or more pointers to memory 6 from A to B, and then setting the memory pointer(s) in A to nil. The configuration in memory after such a transfer is performed is shown in FIG. 7(b). As an interesting special case, an entire named object can be reused by performing this update on the name pointers 3 of the objects.

Targeting

A global extension of the local reuse techniques is known as targeting[3, 6] or build-in-place. It involves compile-time analysis to determine the ultimate disposition of partial results. A data block of size sufficient to hold the result is allocated as early in the execution as possible. The data blocks used to hold partial results then become references to portions of this data block.

An example of targeting is shown in FIG. 8. In the figure, the arrows represent operations, while the boxes indicate blocks of memory. Blocks which must be contiguous in memory are shown as contiguous blocks in the figure. Targeting maps distinct portions of an ultimate large result to the results of intermediate calculations. Before the application of targeting, many different blocks of memory must be allocated to hold the partial and intermediate results, as shown in FIG. 8(a). After targeting, portions of a large contiguous block of memory are used to hold the partial and intermediate results, as well as the final result, as shown in FIG. 8(b).

The techniques of local reuse and targeting have been developed in conjunction with functional languages, which disallow multiple references to an object. However, most commonly-used languages are declarative, and allow multiple references. Thus, the use of these methods also requires rendering the functions to be processed in a functional language. Among other things, this transformation requires that every shallow copy be replaced by a deep one.

2.2.3 Related Patents

Seventeen U.S. patents involving garbage collection (reclamation of shared memory) in computer systems were located using a patent bibliographic database. Among those, the ones most pertinent to the present invention are U.S. Pat. Nos. 5,293,614, 5,241,673, 5,218,698, 5,136,706, 5,088,036, 4,912,629, 4,907,151, 4,814,971, 4,775,932 and 4,755,939. Eighty-seven U.S. patent involving temporary memory were located by the same means. Of these, only the one numbered U.S. Pat. No. 5,136,712 is pertinent to the present invention.

The U.S. Pat. Nos. 5,293,614, 5,218,698, 5,136,706, 5,088,036 and 4,907,151 present various implementations of the two-space copy method. U.S. Pat. No. 5,293,614 describes a system implemented in virtual memory which does not require a read barrier—to prevent inconsistencies from being introduced by running the garbage collection routine in parallel with other processes. U.S. Pat. No. 5,218,698 describes a two-space copy garbage collection scheme implemented in connection with a logic programming system. U.S. Pat. No. 5,136,706 describes a variation of the two-space copy method in which the lifetime of objects is determined adaptively. U.S. Pat. No. 5,088,036 describes another parallel two-space copy method implemented in a paged virtual memory system. U.S. Pat. No. 4,907,151 describes a two-space copy method in which root pointers may point to defunct objects.

The U.S. Pat. Nos. 5,241,673, 4,814,971 and 4,775,932 present modifications of the mark-scan garbage collection method. U.S. Pat. No. 5,241,673 describes a variation of the mark-scan garbage collection method in which the reachability of a node is determined in a manner which is distributed and incremental. This is in contrast to the usual mark-scan scheme in which reachability is determined afresh each time the routine is invoked, by starting from a root or roots and marking all nodes reachable therefrom. Because each memory element stores a list of objects which may reference it, this method also has characteristics in common with the reference-counting scheme. The other two U.S. Pat. Nos. 4,814,971 and 4,775,932 describe hardware systems for implementing the mark-scan method.

The U.S. Pat. Nos. 4,912,629 and 4,755,939 describe various reference counting methods. U.S. Pat. No. 4,912,629 describes a variation of the reference-counting method in which the size of the reference count can be increased as needed. U.S. Pat. No. 4,755,939 discloses exactly the weighted reference counting scheme.

U.S. Pat. No. 5,136,712 makes a distinction between temporary return value objects and declared objects, but uses this only to determine when such an object should be deallocated—making no mention of direct reuse. It also uses a standard reference-counting technique.

2.2.4 Summary of Prior Art

The method of copy-by-reference has been used to avoid expensive deep copy operations. However, this method involves the problem of reclaiming the shared data blocks. Known methods for reclaiming this memory require CPU resources at run time. The mark-scan and two-space copy methods, as well as "lazy" reference counting schemes, are also inefficient in reclaiming unreferenced memory.

The method of direct reuse has been developed in conjunction with functional languages. Functional languages explicitly disallow copy-by-reference, resulting in the proliferation of deep copies. Methods for direct reuse can replace some of these deep copies with shallow copies, but do not support the creation of shallow copies in the source language. Thus, although local reuse may produce a function which requires fewer allocations, it requires the use of a functional language.

Among existing methods, none supports copy-by-reference without requiring additional memory and CPU resources at run time, none implements local reuse in conjunction with a declarative language, and none provides a synthesis of copy-by-reference and direct reuse.

3. SUMMARY OF THE INVENTION

The present invention is a method for allocating memory for manipulations of objects. It is applied to a function definition, and rewrites that function definition in a manner which reduces the use of CPU and memory resources through a combination of copy-by-reference and local reuse, while leaving the external behavior of the function unchanged. The present invention represents a refinement of the method presented by Hildebrandt[5]. In that paper, the idea of subtypes is introduced, but used only to eliminate trivial copies. The present invention uses the concept of subtypes to implement a more general form of local reuse. This, in turn, increases the performance gains which may be achieved through its application.

In contrast to the methods described by Foster and Winsborough[1], and Hennessy et al.[6, 3], the method of this invention can be applied to declarative languages. In addition, this method permits the use of shallow copying (copy-by-reference) without requiring costly memory reclamation procedures at run time. This method therefore concurrently supports local reuse and copy-by-reference. Its novelty and non-obviousness are both demonstrated by the fact that it exhibits highly desirable properties which do not appear together in any known method.

In particular, the present method augments the definition of an object to contain a subtype field. The use of a subtype field is entirely new, and does not appear in any known method. The decision as to whether an argument can be reused within a function is made at compile time, based on the information contained in its subtype field. Thus, the reduction in memory requirements obtained by the present method does not give rise to additional run-time costs. This is in contrast to existing memory reclamation methods which operate without reference to specific type or subtype information, and invariably incur a run-time performance penalty.

By examining the subtype field, the present method can determine which data blocks may be reused by a given operation. In the case in which there are data blocks which can be reused, it causes one or more of them to be reused. In contrast to known methods, the present method does not require the use of a functional language.

Because the present method supports multiple shallow copies, it is also capable of efficiently implementing value semantics for destructive functions. In particular, it allows the assignment operation to produce a return value. Whereas the statement A=B=C; is illegal in a functional language, it has a natural interpretation in value semantics—"B is replaced by a copy of C and then A is replaced by a copy of B".

In the special case in which the operation to be performed is the assignment (copy) operation and the source and target operands refer to the same memory block due to local reuse, the copy operation becomes trivial and can be eliminated. The present method identifies these cases and thus eliminates trivial deep copy operations. This is because the present method records in the subtype field whether or not an object can be reused, rather than forcing every object to be reusable as is the case with functional languages.

4. OBJECTS OF THE INVENTION

It is therefore an object of the present invention to provide a method for reclaiming memory following the use of copy-by-reference without utilizing additional CPU resources at run time.

It is a further object of the present invention to provide a method for reclaiming memory following the use of copy-by-reference without utilizing additional memory resources at run time.

It is a further object of the present invention to provide a method for local reuse of memory applicable to declarative languages.

It is a further object of the present invention to provide a method for local reuse of memory without requiring the utilization of additional CPU resources at run time.

It is a further object of the present invention to provide a method for local reuse of memory without utilizing additional memory resources at run time.

It is a further object of the present invention to provide a method for the local reuse of memory which also allows the use of copy-by-reference.

It is a further object of the present invention to provide an efficient method for implementing value semantics for operations on objects.

It is a further object of the present invention to provide a method for eliminating trivial deep copies in assignment operations.

5. BRIEF DESCRIPTION OF THE DRAWINGS

A full understanding of the invention can be gained from the following description of the preferred embodiment when read in conjunction with the accompanying drawings in which:

FIG. 2 represents the local store associated with a function during execution. (PRIOR ART)

FIG. 7 represents local reuse. (PRIOR ART)

6. DETAILED DESCRIPTION OF THE PREFERRED EMBODIMENT

Figure 1:
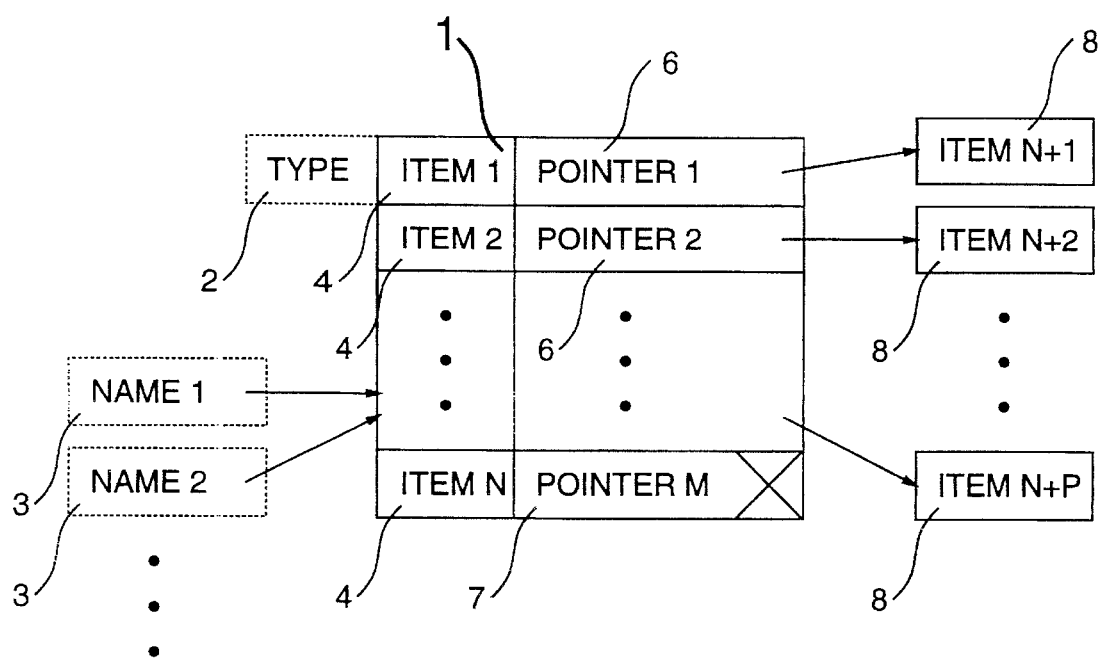
FIG. 1 represents an object. (PRIOR ART)
Figure 3:
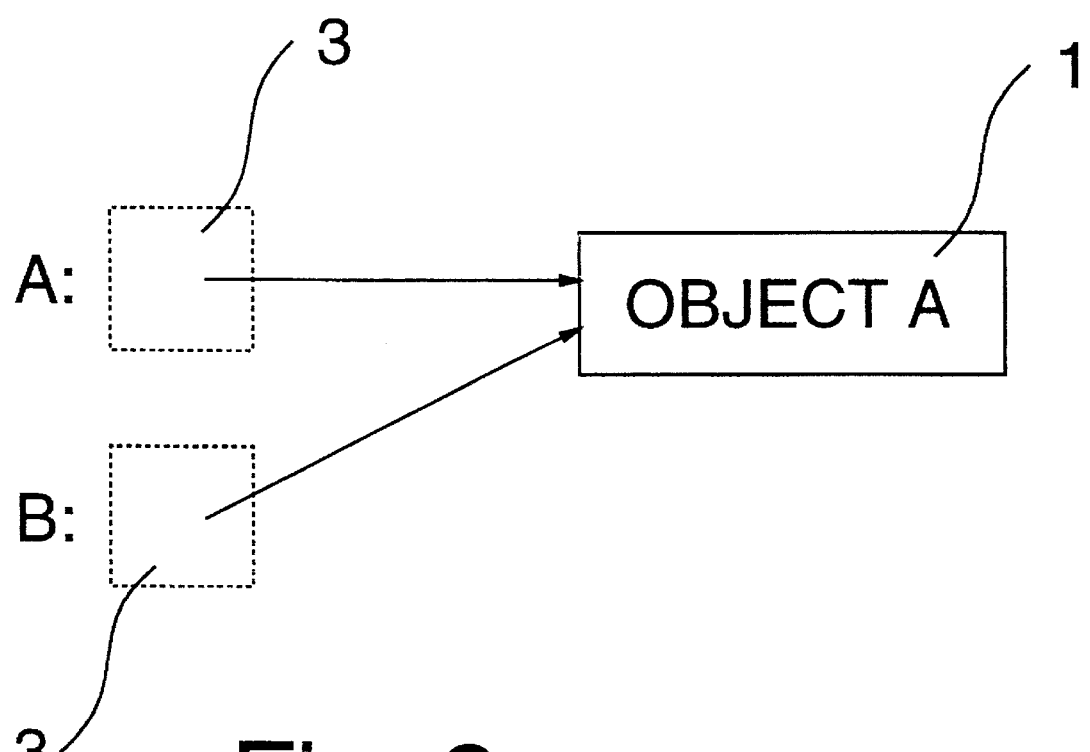
FIG. 3 represents a copy-by-reference operation. (PRIOR ART)
Figure 4:
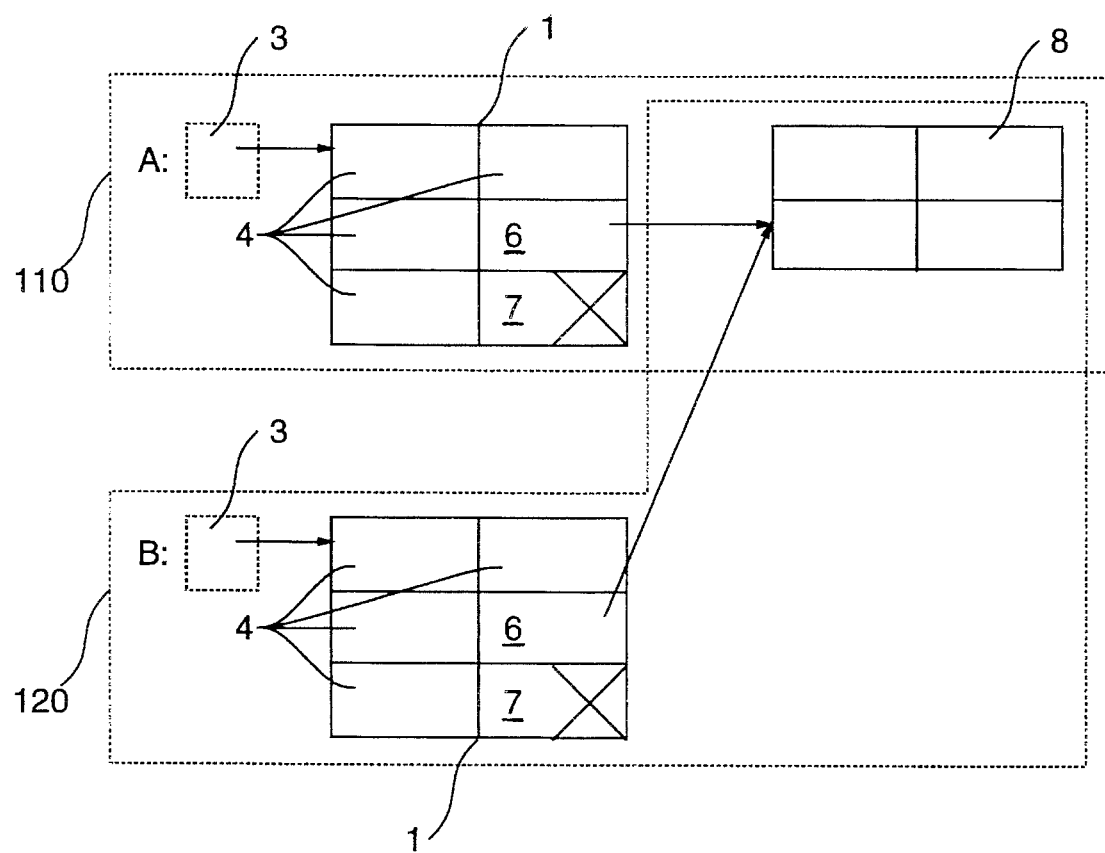
FIG. 4 represents a shallow copy operation. (PRIOR ART)
Figure 5:
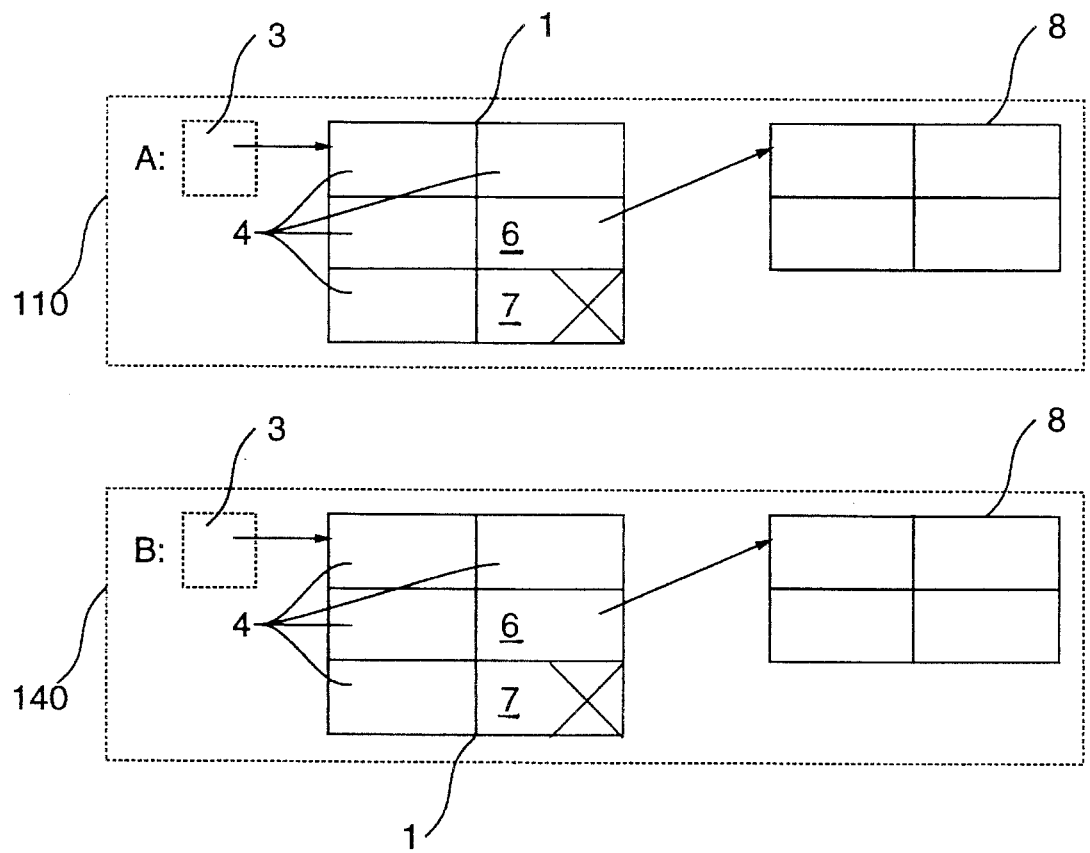
FIG. 5 represents a deep copy operation. (PRIOR ART)
Figure 6:
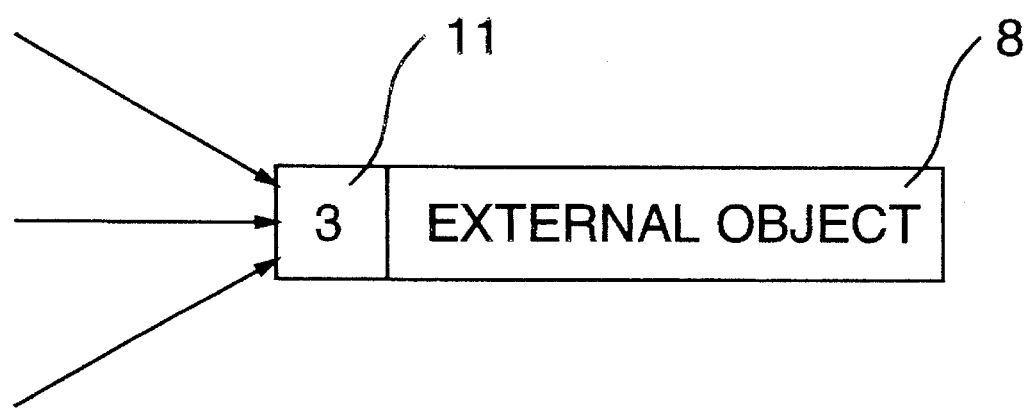
FIG. 6 represents a reference count attached to an external object. (PRIOR ART)
Figure 8A:
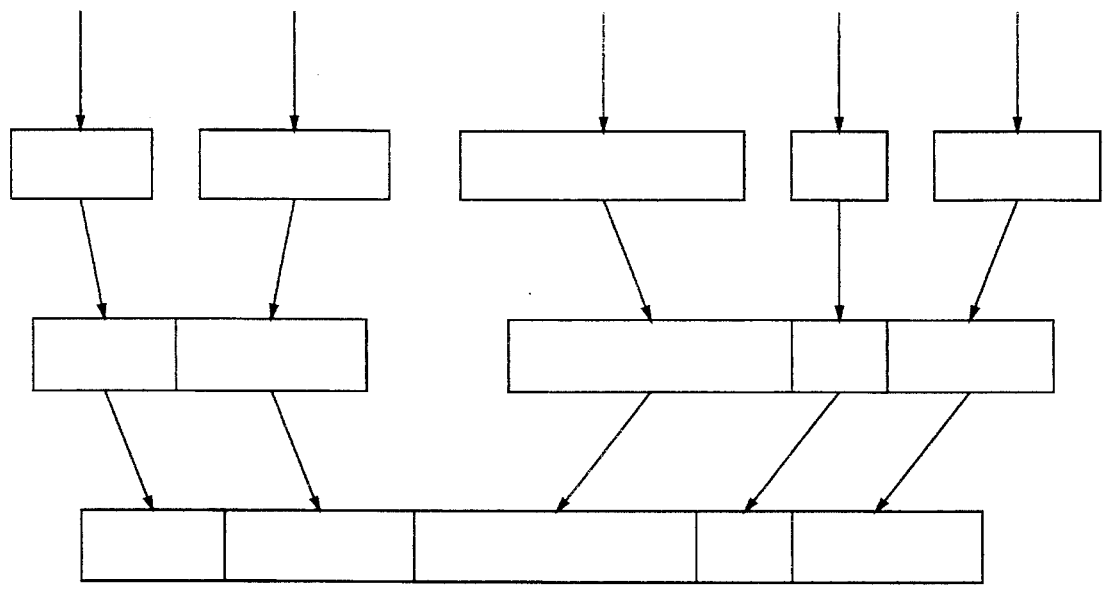
FIG. 8 represents targeting. (PRIOR ART)
Figure 8B:
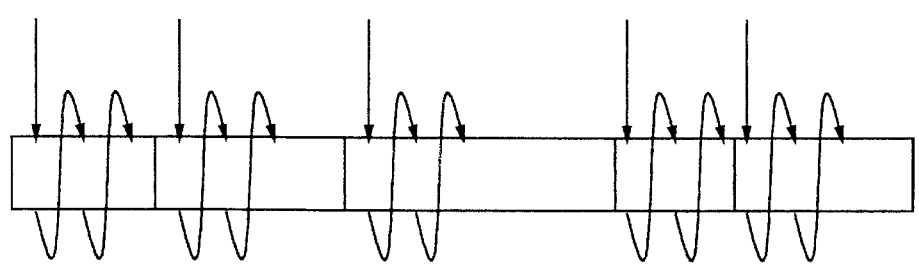

The method of the present invention is applied to the specification 300 in a declarative language of a function 340 which does not reuse memory 200 and produces the specifications 340 of a function 322 which reuse memory locally. In addition, this method supports copy-by-reference without requiring expensive run-time reclamation operations.

Since the preferred embodiment is implemented in a source language, it does not have access to the symbol table 272, and therefore cannot redefine an object 1 (change the location to which its name pointer 3 points). Because of this, copy-by-reference implies shallow copying 120 and local reuse implies reuse of only the external objects 8 of an object 1. However, a source-code implementation is not essential to the method, and it is equally amenable to object-code implementations in which it would function in cooperation with a compiler 270. In this case, copy-by-reference can create aliases and local reuse can utilize internal as well as external objects.

The present method is based on the use of a subtype 102, which refines a previously-defined type 101. Objects 100 with different subtypes 102 differ in the evolution of their ownership of memory. Interaction of one pair of subtypes provides an efficient implementation of shallow copying 120, while the interactions of another pair simultaneously implements reuse 160. Both types of memory reuse 160 are implemented in such a way that they do not require additional run-time resources.

The interactions among subtypes gives rise to a number of cases which must be considered in the definition 340 of a function which is to manipulate objects of the given base type. The present method modifies each function definition in order to handle these cases. One possible implementation handles these cases by using conditionals within the function definition. In the preferred embodiment, however, the function overloading capability of object-oriented programming languages is utilized by implementing each case as a different (overloaded) version of the same function. Compile-time resolution of an overloaded function causes the correct case to be selected through reference to the subtypes of the operands 340. Thus, no run-time CPU resources are required to select the appropriate case. Inheritance and polymorphism are then used to simplify the implementation by merging similar cases.

In any case, reductions in the complexity of the implementation due to the use of an object-oriented language is not considered to be essential to the present method. The fact that some object-oriented compilers merely translate their input into a non-object-oriented language (which is then compiled in the usual fashion) shows that, through a similar transformation, the present method also has non-object-oriented embodiments.

The present method proceeds in two main steps:

First, a list of all objects 1 whose memory 220 can be reused is generated. Then, each function invocation 348 contained in the function definition 340 is rewritten as follows: Objects are added to the list if they are last read by the current invocation. (Here, the definition of last reading is global, meaning that it is never read again in the entire application.) When this step is complete, it is determined if objects on the list can be used to hold the results written by the current invocation, in preference to allocating new memory. If so, these objects are reused, and the list is updated to reflect this.

As discussed in the section on prior art (Subsection 2.2), the determination of which objects can be reused normally depends upon the restriction of the input language to being a functional language (in which case the number of readers is 348 guaranteed to be at most 1). In contrast, the present method uses a subtype field to indicate when an object has at most one reader. Assigning a different value to the subtype indicates that the corresponding object can have more than one reader. Thus, the restriction to a functional input language can be dispensed with.

The utility of the subtype field 102 can be extended to support efficient memory reclamation following shallow copy 120 (copy-by-reference) operations. This is done by introducing the novel concept of ownership. Correct reclamation requires that memory 8 shared among many objects be deallocated only after the last reference 6 to it has been deleted. In fact, this can be replaced by the weaker requirement that no attempt be made to access the shared data after it has been deallocated. One object may then be specified to be the owner of said shared data 8, while it is required that any non-owner referring to the same data access that data only while the owner 1 is "alive".

Given this, there are no run-time decisions to be made regarding when said shared data 8 can be deallocated: As soon as the owner is deleted, the shared data is deallocated. The method of the present invention uses the subtype field to distinguish an owner from a non-owner, and ensures that the restriction on the liveness of the owner is met. In this way, it correctly and efficiently implements memory reclamation following shallow copying.

6.1 Subtypes

Figure 9:
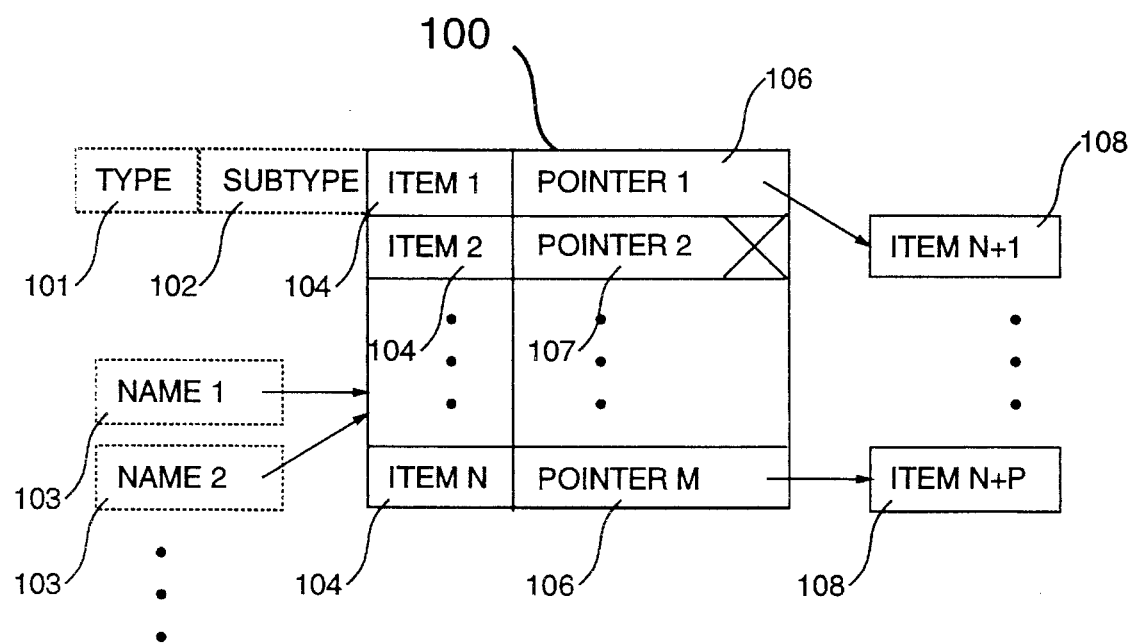
FIG. 9 represents an augmented object.
Figure 10A:
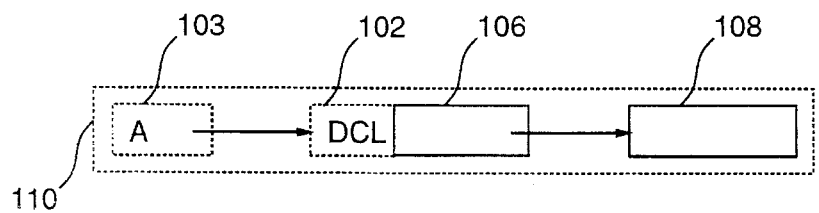
FIG. 10 represents subtype-based copy-by-reference.
Figure 10B:
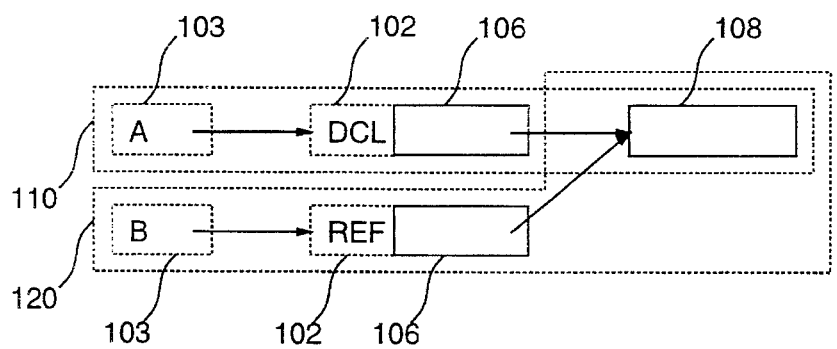
Figure 10C:
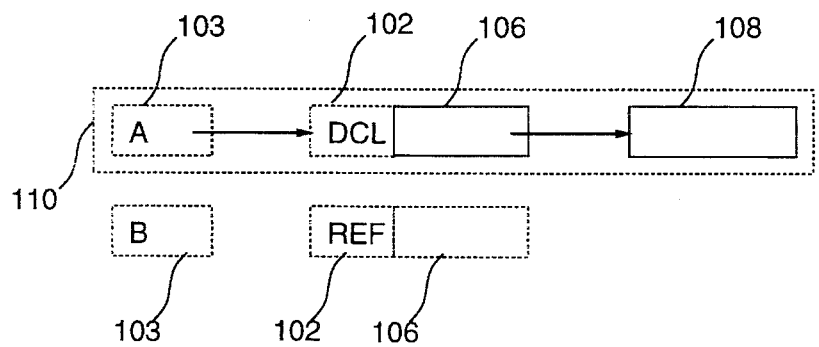
Figure 10D:
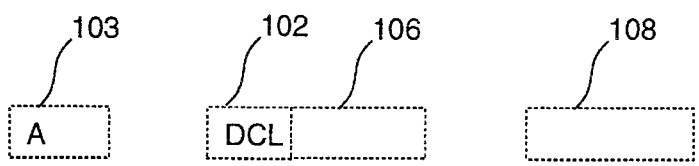
Figure 11A:
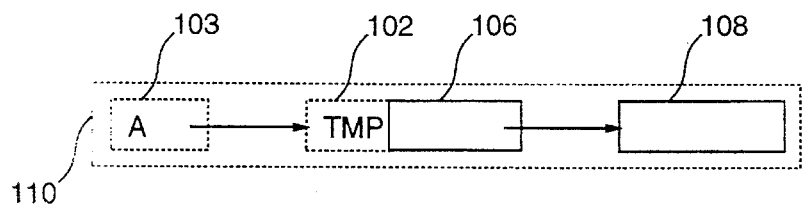
FIG. 11 represents subtype-based local reuse.
Figure 11B:
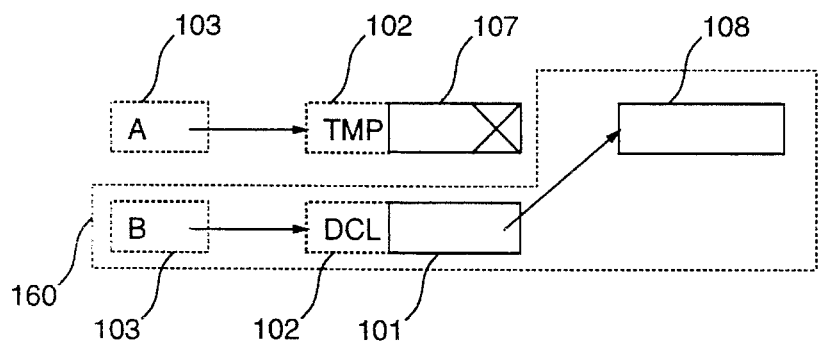
Figure 11C:
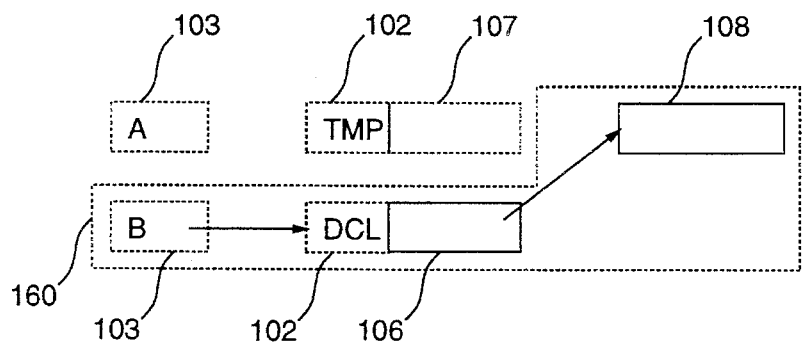
Figure 11D:
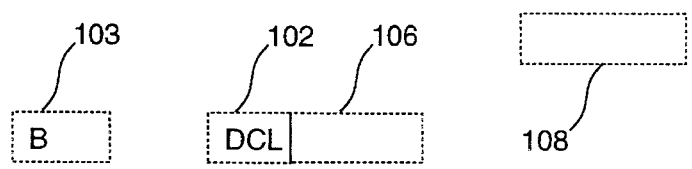

In order to achieve the advantages discussed above, the method of the present invention requires that the definition of an object be augmented to include a subtype field. FIG. 9 represents the data comprising such an augmented object 100. The type field 101 contains the type of the object; the subtype field 102 contains the subtype of the object. The object contains zero or more items 104, zero or more nonnull pointers 106 and zero or more null pointers 107. The nonnull pointers 106 point to other objects, which have been labelled 108 to distinguish them from the main object of interest 100. An augmented object can also have zero or more names 103 associated with it.

The type field 101 and the subtype field 102 associated with an augmented object 100 are utilized by the present method only at compile time, and may be removed from the run-time representation of the object. In the figure, this fact is denoted by enclosing the type and subtype fields in dashed boxes. Names 103 may also be removed from the object at compile time. In the preferred embodiment, the name, type and subtype fields are removed during compilation. Therefore at run time, an augmented object 100 is indistinguishable from an ordinary object 1, which means that this method does not increase the amount of memory required to store an object at run time.

The subtype field 102 may contain one of three values— Ref, Dcl and Tmp—which have the following interpretation:

Dcl—Indicates that this object is declared explicitly, and therefore has ownership of the external objects to which it refers.

Tmp—Indicates that this object is a temporary or return value, and owns external objects to which it refers. However, objects of this subtype are guaranteed never to have more than one reader.

Ref—Indicates that this object contains a shallow copy of a declared object. By definition, it does not have ownership of the external objects to which it refers. It is assumed that an object of this subtype is never used after the declared object to which it refers has been deallocated.

In the preferred embodiment, the subtype field is added by defining three distinct types 330, and then treating these as three subtypes of one type. There is a fourth value which may be associated with a subtype field by virtue of its absence. An object which lacks a subtype field is said to have a subtype of Other. An object which has not been defined using the present method must necessarily have the subtype Other. Objects of the Dcl and Other subtypes are called declared objects.

6.2 Subtype-Based Copy-by-Reference

Shallow copying is supported by the interaction of the Ref and Dcl types, and depends on the correct behavior of their deallocation operations (destructors). The implementation is based on the novel concept of ownership. An object with the subtype Dcl owns its external data 108. It therefore has arbitrary control over said external data, and can deallocate it regardless of the number of existing references to it. In contrast, a Ref object owns only its internal data 104, and can never deallocate any external data 108 to which it points 106.

Once ownership is established, any number of reference copies 120 can be created, either directly from the original Dcl object 110 or indirectly through other Ref objects 120 that ultimately point to the original Dcl object. Ref copies can be destroyed at any time. However, since destroying the original Dcl object will also deallocate the data 108 to which any Ref copies point, it is not legal to access a Ref copy after its original Dcl object is destroyed. Any method using the concept of ownership must ensure that this condition is met.

In the preferred embodiment, this condition is guaranteed by forcing Ref objects 120 to be created with respect to an existing Dcl or Ref object 100, and prohibiting any changes to the pointers 106 in said Ref object prior to its destruction. Then, since one can only access objects in the current scope or an enclosing scope, a Ref object will go out of scope and be destroyed no later than the Dcl object to which it refers. This also requires that Dcl objects not be destroyed before the end of the scope in which they are created, but most object-oriented languages do not support such an operation anyway. The conditions on subtype-based copy-by-reference which must be satisfied by the implementation are restated below.

1. A reference copy of an object always has the subtype Ref.
2. A Ref object always (ultimately) refers to an object of the Dcl type in the current scope or an enclosing scope.
3. A Ref object may not be used after the declared object to which it refers has been deallocated.

Given these conditions, it is straightforward to implement the constructors and destructors for objects of these two subtypes. The constructor for a Dcl object can have a number of different forms. These correspond exactly to the forms defined for the original object type. Constructors for the Ref subtype must also adhere to the restriction that a Ref object does not own any external data. Thus, the only valid constructors for a Ref object are those which force it to refer to other data as it is being created. The general form for destructors for the Dcl and Ref subtypes is given in the following two algorithms.

Algorithm 7.2.1. Destructor for Dcl Objects

Step 1. Destroy all external objects referenced by this object.
Step 2. Destroy this object.

Algorithm 7.2.2—Destructor for Ref Objects

Step 1. Destroy this object.

As an example of the manner in which copy-by-reference functions in this implementation, FIG. 10 shows the configuration in memory at various stages in the use of a shallow copy. In FIG. 10(*a*), an object A of subtype Dcl has been created. In (*b*), a Ref copy B has been created. Note that both objects point to the same external object. In (*c*), the Ref copy B has been deleted. The algorithm for deleting Ref objects does not attempt to deallocate any external objects. Finally, when A goes out of scope, it is destroyed (*d*). As part of this destruction operation, the external object owned by the object is also deallocated.

6.2.1 Conditions for Use

As discussed above, a shallow copy creates virtual aliasing among the shared objects. Whereas it is possible for a compiler to take a correct function 340 and replace some deep copies with shallow copies without changing the function's behavior, it is not possible for it to resolve which type of copy is intended if it is presented with an ambiguous case.

In general a deep copy 140 may be replaced by a shallow copy 120 if that copy is never overwritten. Further, a shallow copy may replace a deep copy if the result of any operations on that copy are copied back to the original 110 before the original is otherwise modified. Existing methods for local reuse use analyses based on such rules to replace deep copies with shallow ones. However, they do not support the explicit use of copy-by-reference in the source language.

In the method of the present invention, copy-by-reference is supported in the source language, and such a semantical analysis is not performed. Such an optimization is not considered to be an essential component of the present method, and can left to the user given that copy-by-reference is efficiently supported.

6.2.2 Value Semantics

A specific extension of the present method incorporates the consistent insertion of copy-by-reference. Namely, the implementation of value semantics for destructive operations requires that the return value of an operation be a copy of the modified target operand. A destructive operation has both a target 362 (the operand which is modified) and a return value. In most implementations, the return value is void, since it would be expensive to consistently perform a deep copy to generate said return value. However, since the present method supports shallow copies, consistently returning a copy of the modified target adds only a very small increment to the run-time cost of the implementation.

6.2.3 Implementation

Given the above description of the behavior of subtype-based copy-by-reference and the conditions which must be met for its use, it is now possible to state the steps of the method used in the preferred embodiment to translate a function definition which does not use subtype-based copy-by-reference into one which does.

Algorithm 7.2.3—Subtype-Based Copy-by-Reference

Step 1. Read the function definition 340.
Step 2. Assign subtypes 102 to its temporary variables 310 and return value 326.
Step 3. Generate the family of function definitions F.
Step 4. For each function definition $f$ in F,
  Step 4A. Translate $f$ into a form compatible with the definitions and conditions on the Ref and Dcl subtypes.
  Step 4B. Write out the modified $f$.

Algorithm 7.2.4—Assign Subtypes

Step 2 of Algorithm 7.2.3 can further be expanded as follows:
Step 1. For each temporary object 310 declared within the function 340,
  Step 1A. If the definition 330 of the type 302 of this operand 310 is under user control,
    Step 1Ai. If the temporary 100 is used as a shallow copy of another object, set its subtype to Ref.
    Step 1Aii. Else, set its subtype to Dcl.
  Step 1B. Otherwise, assign to it the subtype Other.
Step 2. If the definition 300 of the type 326 of the return value is under user control,
  Step 2A. If value semantics are to be used and this function is a destructive operation, make the return value a shallow copy of the target 362.
  Step 2B. If the return value is a shallow copy of another operand, set its subtype to Ref.
  Step 2C. Else, set the subtype of a nonvoid return value to Dcl.
Step 3. Otherwise, set the subtype of a nonvoid return value to Other.

Algorithm 7.2.5—Generate Subtyped Function Family

Step 3 of Algorithm 7.2.3 can further be expanded as follows:
Step 1. Place the function definition in the family of functions F.
Step 2. For each operand o in the function definition,
  Step 2A. If the definition of the type of o is under user control,
    Step 2Ai. If o is a constant operand, replace each function definition $f$ in F with that $f$ in which the type of o is replaced by that type augmented with the subtype Ref.
    Step 2Aii. Else, replace each function definition $f$ in F with two function definitions in which the type of o is replaced by that type augmented with the subtypes Ref and Dcl, respectively.
  Step 2B. Otherwise, replace each function definition $f$ in F with that $f$ in which the type of o is replaced by that type augmented with the subtype Other.

Algorithm 7.2.6—Translate Function Definition

Step 4A of Algorithm 7.2.3 can further be expanded as follows:
Step 1. If the target 362 of function $f$ has the subtype Ref,
  Step 1A. If $f$ is a constructor which performs a deep copy of its argument(s), replace the deep copy with a shallow copy.
  Step 1B. If $f$ is a constructor which does not perform a deep copy of its argument(s), delete it and return.
  Step 1C. If $f$ is a destructor, remove any deallocations 348 of external objects 108.

6.3 Subtype-Based Local Reuse

Local reuse is achieved through the knowledge that an object 100 has only one reader. In the implementation of the present invention, this condition is indicated when an object bears the subtype Tmp. In contrast, both Dcl and Ref objects can have any number of readers.

In the preferred embodiment of the present method, any function returning an object which owns (allocates) the memory 108 to which it refers 106 is caused to label that object with the Tmp subtype. However, such return values are not named in the calling function. Therefore, the only means by which such an object can be accessed and used is if it becomes an actual parameter to another function. In this way, the name 304 of the corresponding formal parameter 310 becomes bound to the unnamed temporary object, making it possible to manipulate it and the memory it references. Thus it can be seen that a Tmp object is accessible only when it has a name associated with it through a function invocation, according to the scoping rules of the language used.

One can think of local reuse as early reuse of the memory allocated to a Tmp object. The external memory pointed to by a Tmp object will either be reused within the function in which that Tmp object is declared, or it will be returned to the free store 220 when the function is exited and that Tmp object goes out of scope. In either case, the external memory used by that Tmp object is available for other uses after the function is exited.

In the cases created by the present method in which memory reuse is possible, memory belonging to a Tmp object is allocated to another object of the Dcl or Tmp subtype, and the memory pointer(s) of the Tmp object is (are) set to nil 212. The memory belonging to that Tmp object is thus reused before the original Tmp object goes out of scope. When it does go out of scope, it has no memory left to be deallocated, so no deallocation is performed.

For the deallocation of a Tmp object, there are two cases. If the memory of the Tmp object has been reused, then its memory pointer will be nil, indicating that there is nothing to deallocate. If the pointer is non-null instead, then the memory is deallocated. These rules cause the destructor for a Tmp object to function just as if it were the destructor for a Dcl object.

An example of local reuse is given in FIG. 11. Initially, a Tmp object A is created, and an external object allocated to it (a). Some time later, another Tmp or Dcl is created (shown as Dcl B in the figure), and allocated the external object which previously belonged to A (FIG. 11(b)). This is accomplished by copying the pointer(s) to A's external object(s) into B and then setting that (those) pointer(s) to nil in A. When the current scope is exited, both objects are destroyed. In object A, the external memory pointer is nil, so no external memory needs to be deallocated before A is destroyed. (FIG. 11(c)) for object B 160, the external object to which it points is deallocated first, then object B itself (FIG. 11(d)).

6.3.1 Conditions for Local Reuse

For local reuse to function properly, a number of conditions must be met in the functions which make use of it. According to the definition of a Tmp object, if such an object appears as a formal parameter in a function definition, it is immediately known that that object has no other readers save those which appear in the same function definition. Therefore, the memory referenced by that object can be reused after it is last read within that function. Furthermore, that function can mark the Tmp object as available for reuse at that point in its execution.

The conditions under which local reuse can be applied are listed below.

1. Only temporary objects or operands of the Tmp subtype can be reused.

2. Only objects of the Dcl or Tmp type may reuse the memory of another object.

3. All accesses to a Tmp object passed as a parameter 344 to the function being defined must be completed prior to the reuse of its memory.
4. The sole exception to Rule 3 above is if an operation involving the same memory for input and output is virtually atomic (see below).
5. The memory block 220 being reused must be large enough to accommodate the data 214 that are being written into it.

Regarding Rule 4 above, it is normally the case that memory belonging to an object which is read by a given function cannot be reused to hold the output of the same function. However, if the function is performed in such a way that no location in the memory being reused is overwritten before it is last read, then the same memory may be attached to both input and output parameters of a function. In this case, the allocation of the memory to the output parameter is accomplished prior to the function invocation while deallocation of the same memory (deleting the reference) from the Tmp object is accomplished after the function invocation.

Since in general, only the memory owned by a Tmp object can be reused, reuse will be maximally facilitated if operations return Tmp objects in as many cases as possible. The method of the present invention fulfills this desideratum by causing the return value of every nondestructive operation to assume the subtype Tmp.

6.3.2 Copy-By-Assumption

Figure 12A:
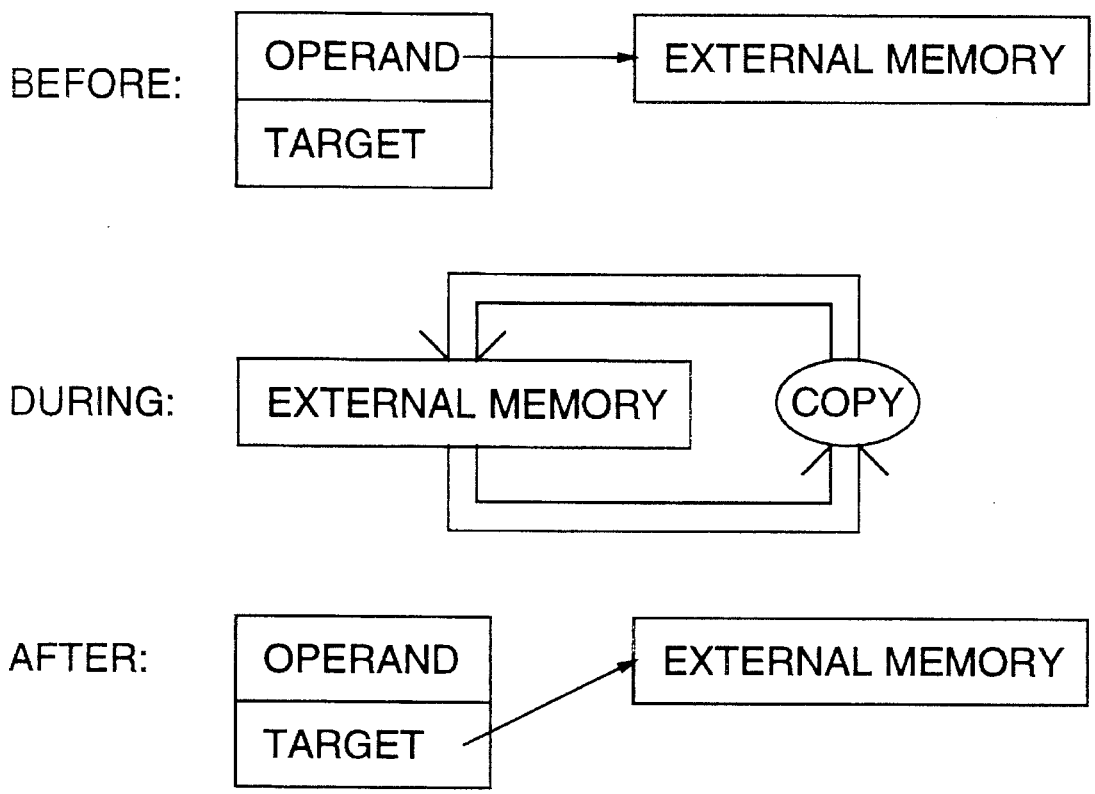
FIG. 12 represents a copy-by-assignment operation.
Figure 12B:
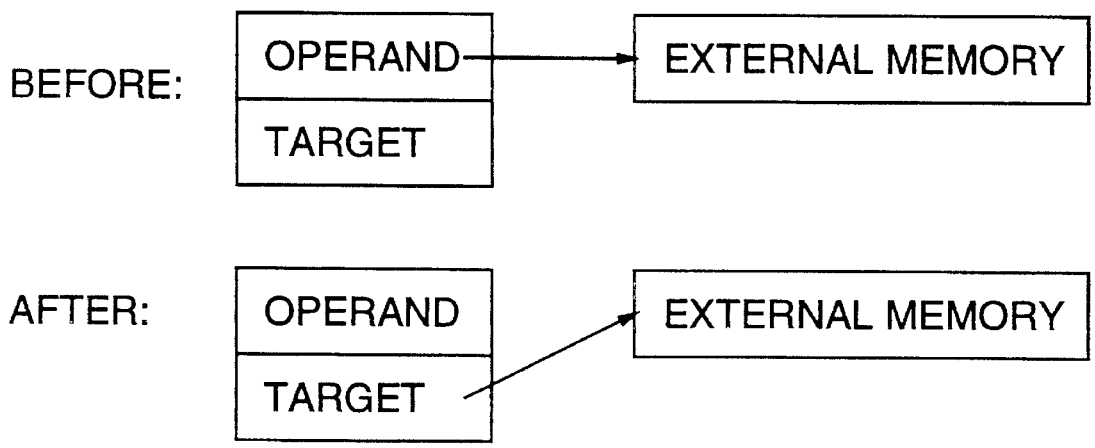
Figure 13:
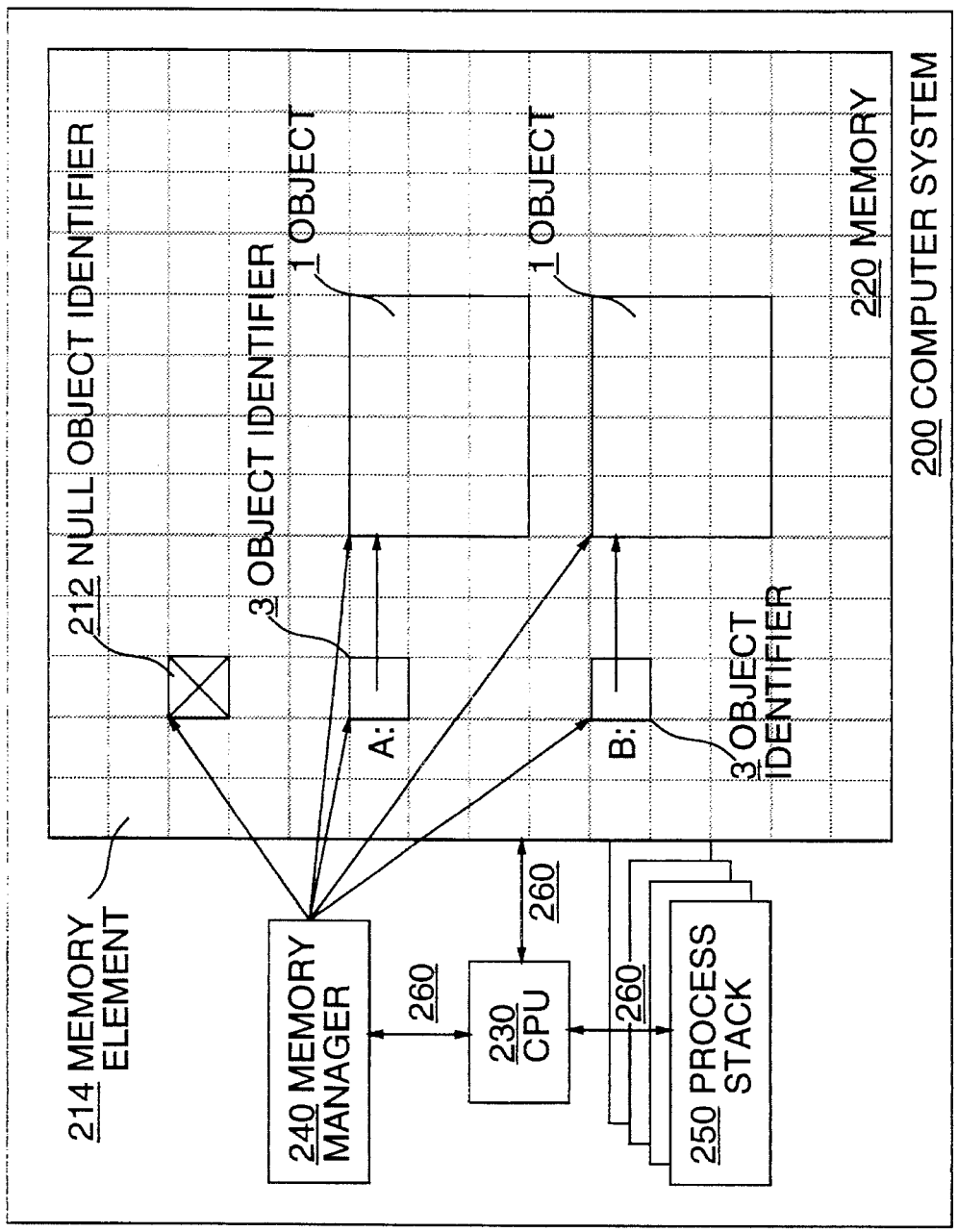
FIG. 13 represents a computer system. (PRIOR ART)
Figure 14A:
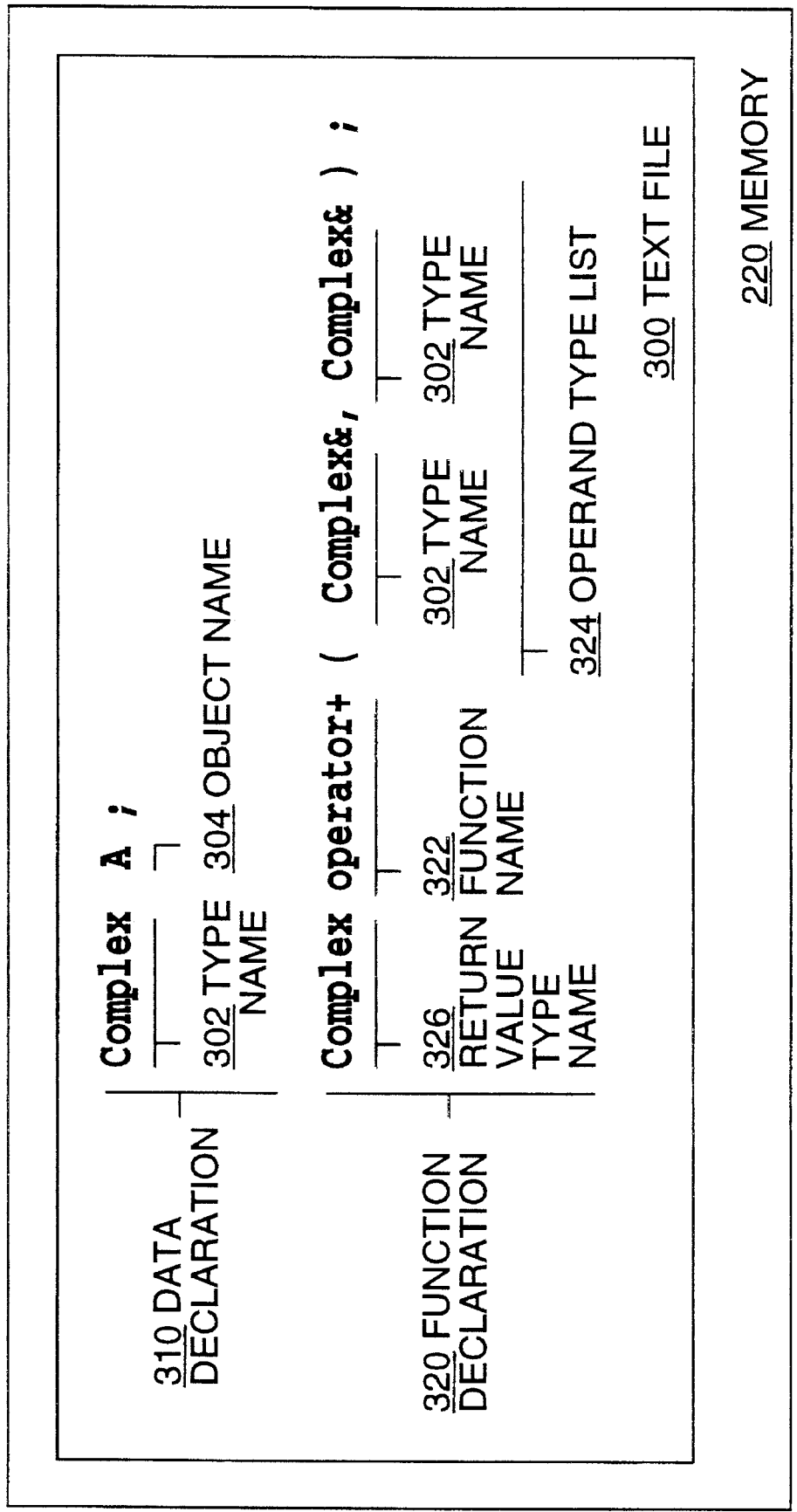
FIG. 14 represents C++ source code stored in a text file within the memory of a computer system. The source code elements represented are: (A) data and function declarations; (B) a type specification; (C) a function definition; (D) a parameter; (E) a change of type (i.e., a "cast"); and (F) special function invocations for creation, assignment and deletion. (PRIOR ART)
Figure 14B:
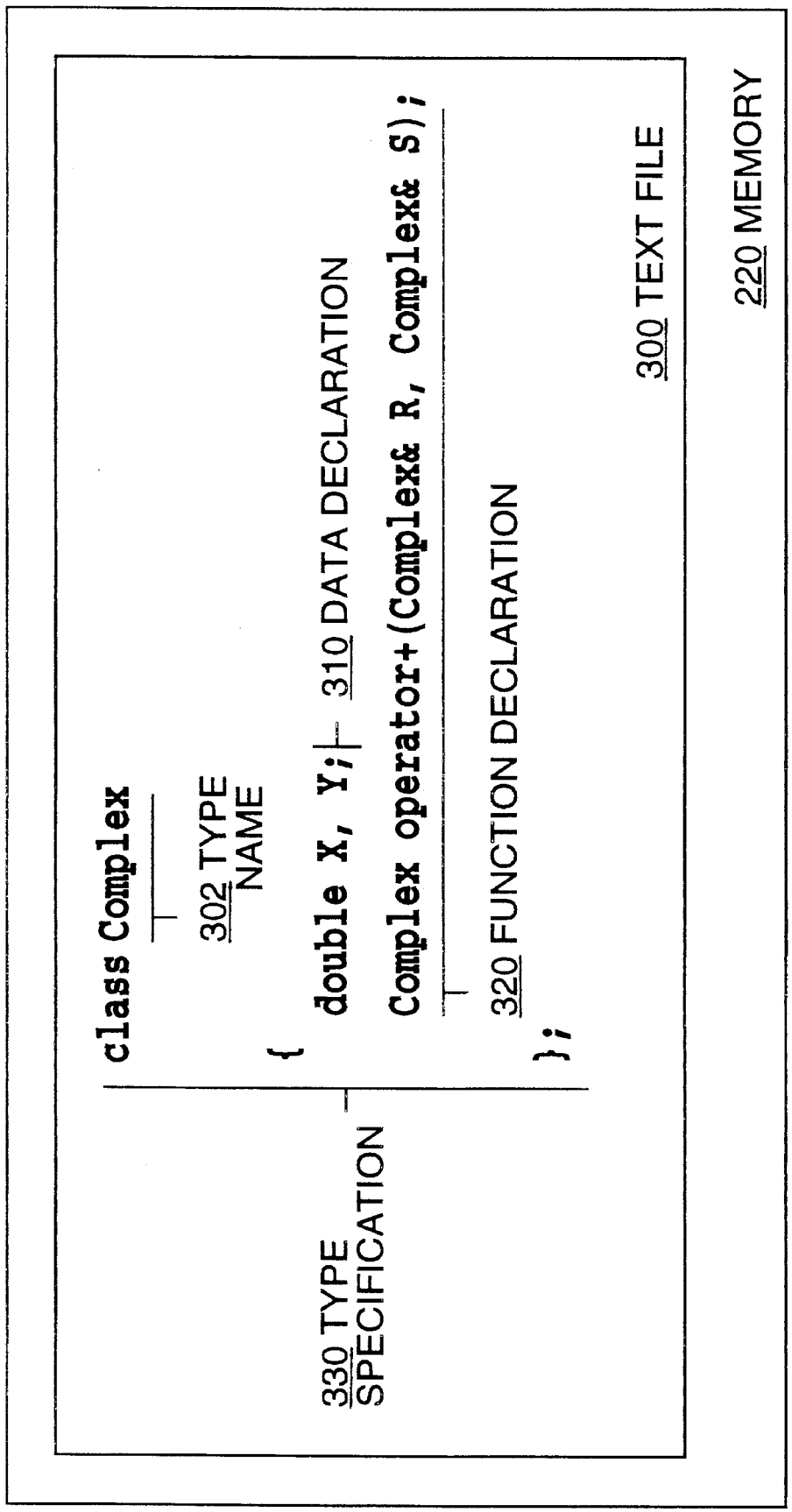
Figure 14C:
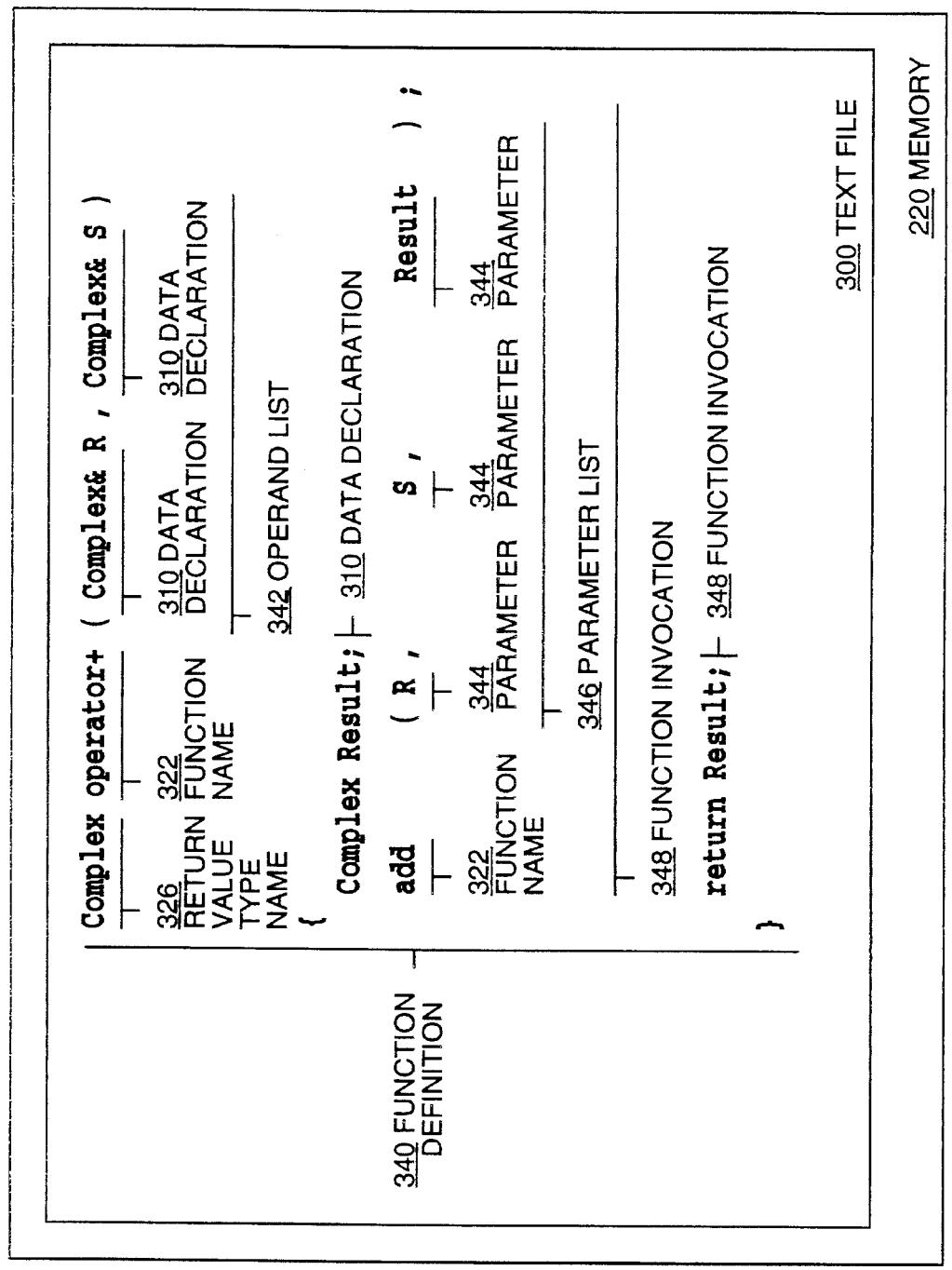
Figure 14D:
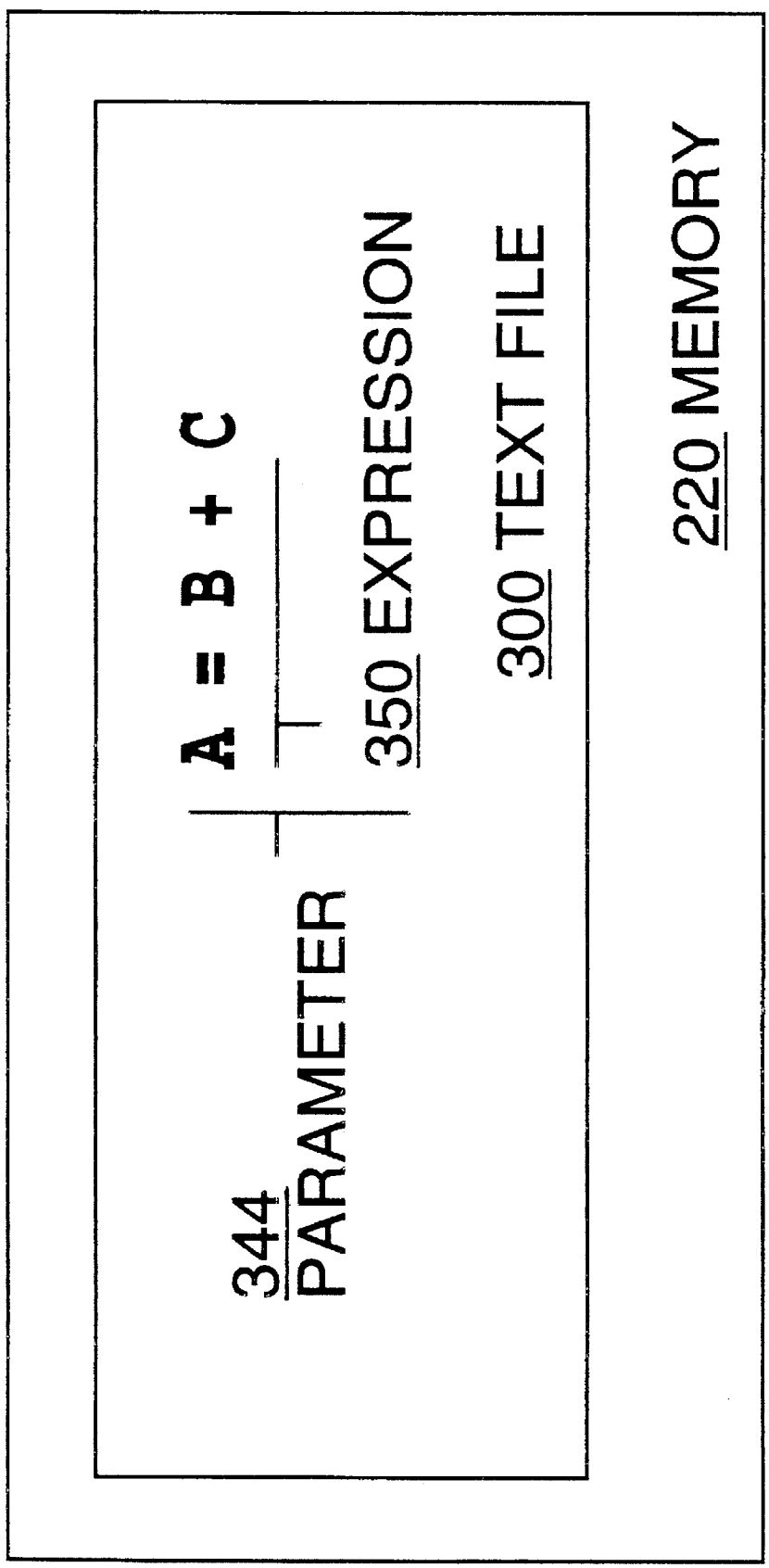
Figure 14E:
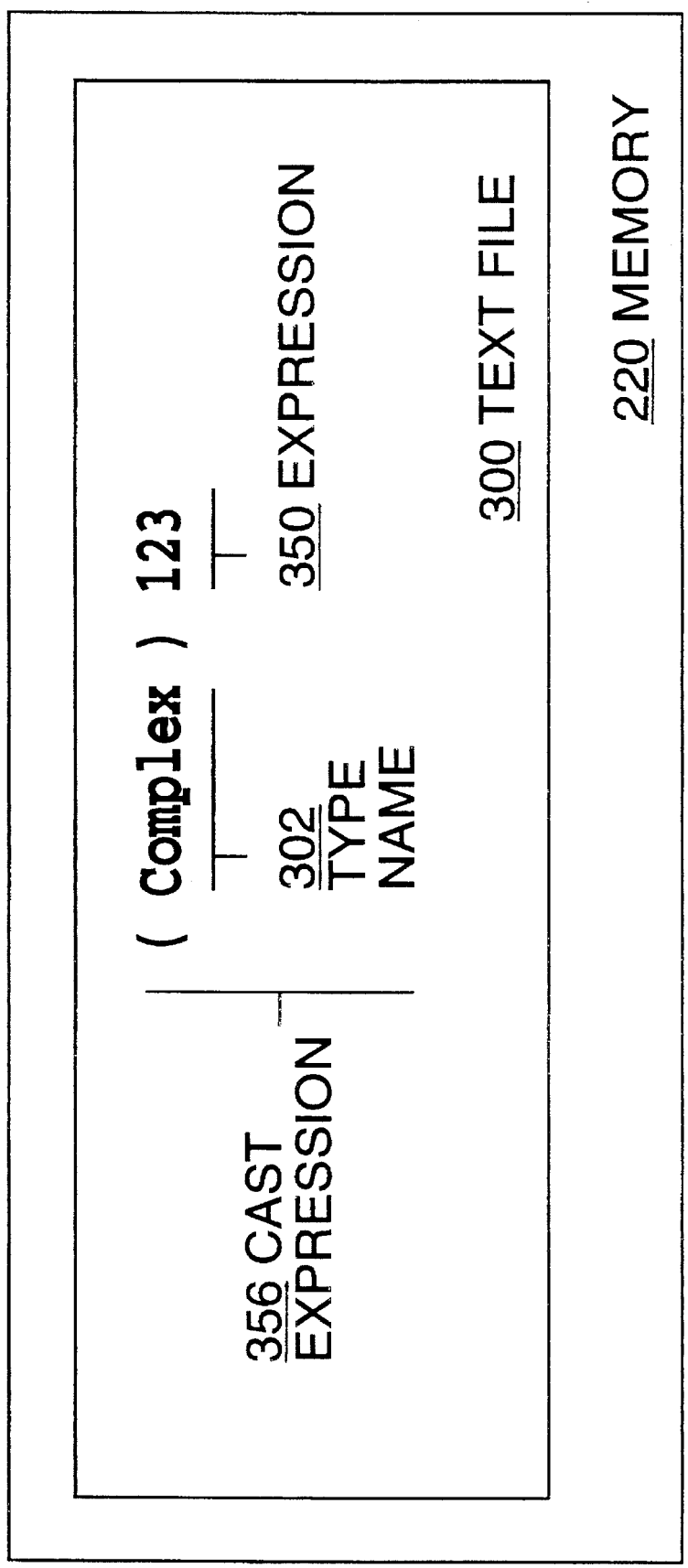
Figure 14F:
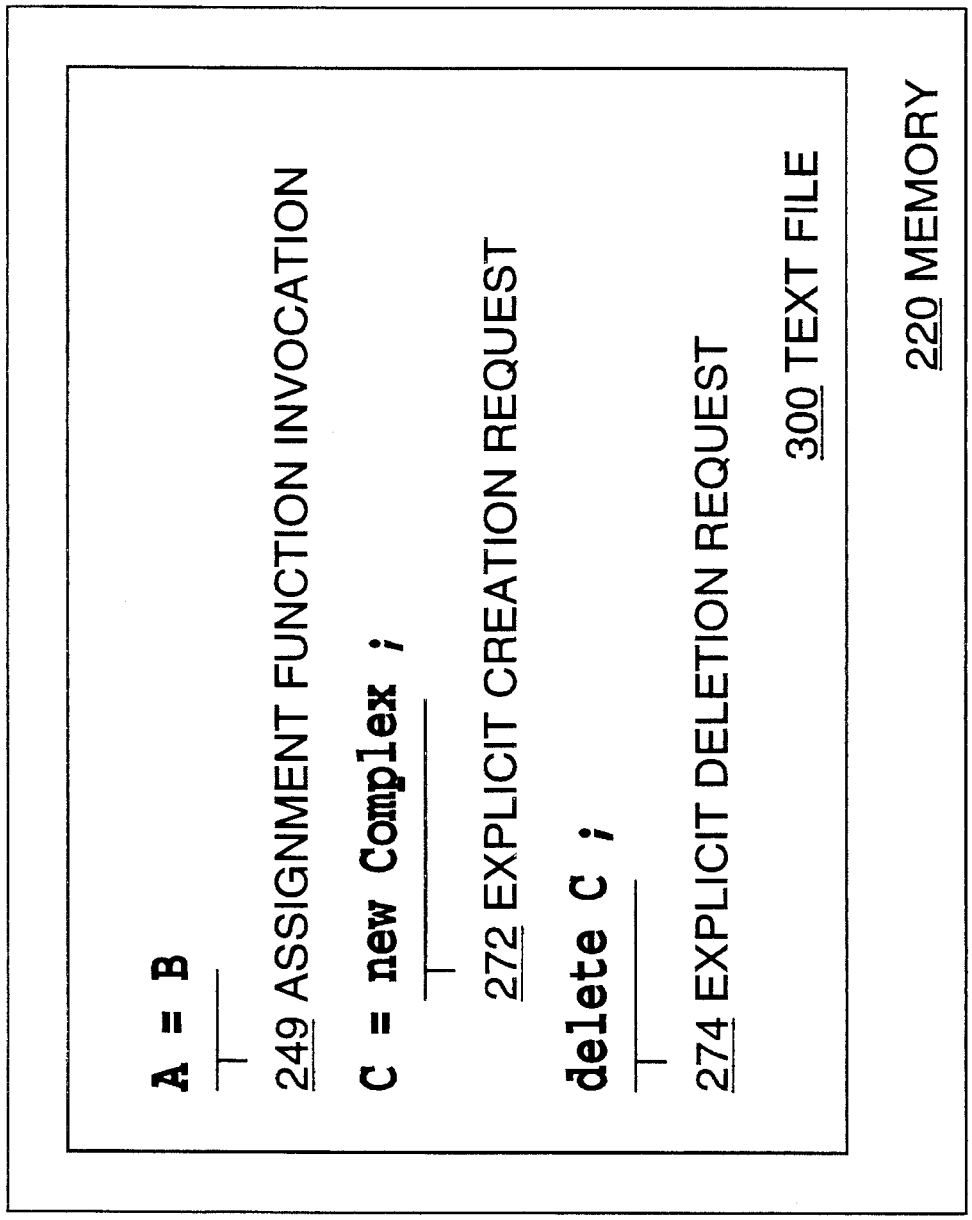
Figure 15A:
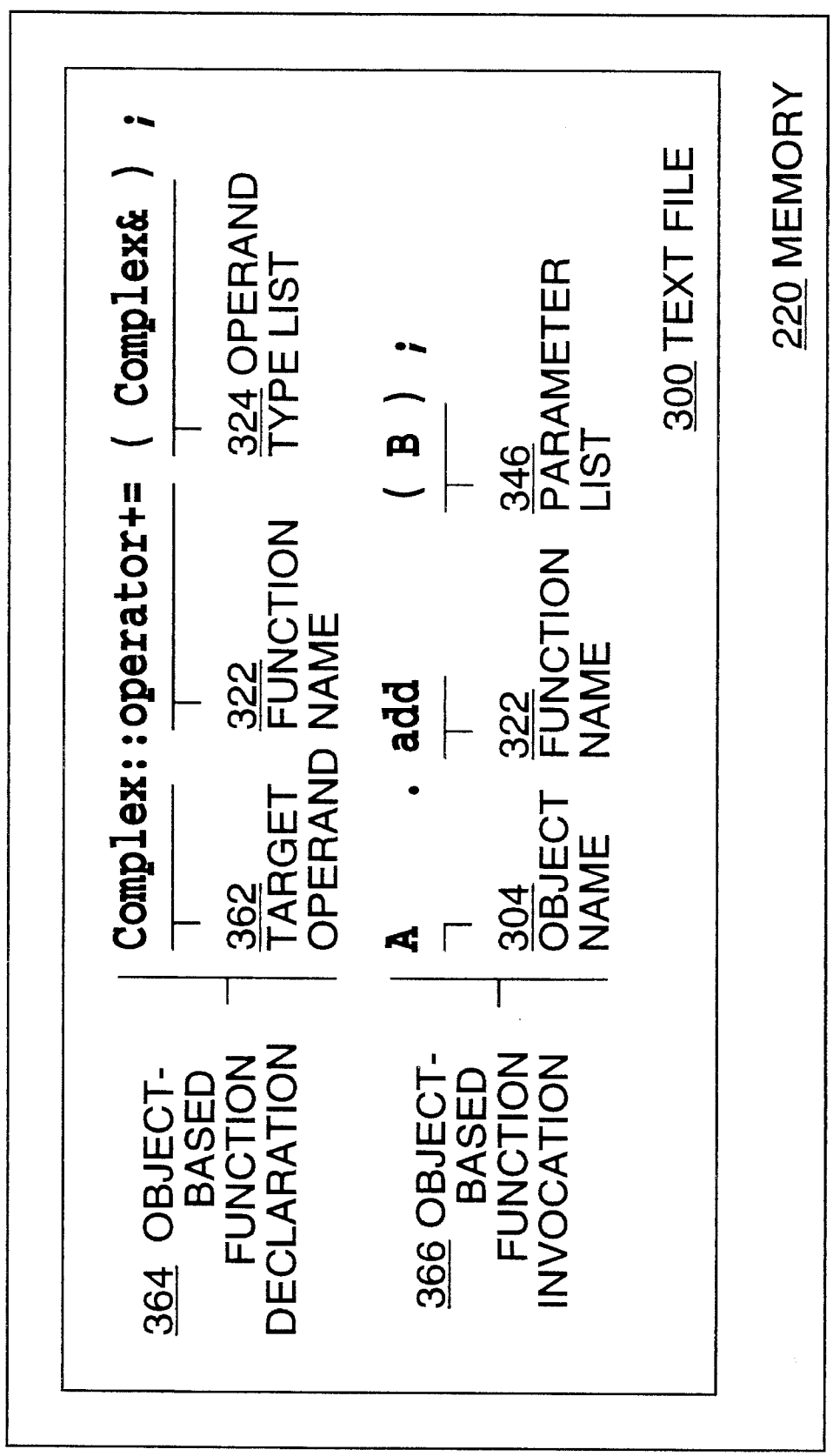
FIG. 15 represents object-based elements in C++ source code: (A) Function declaration and invocation; (B) Function definition. (PRIOR ART)
Figure 15B:
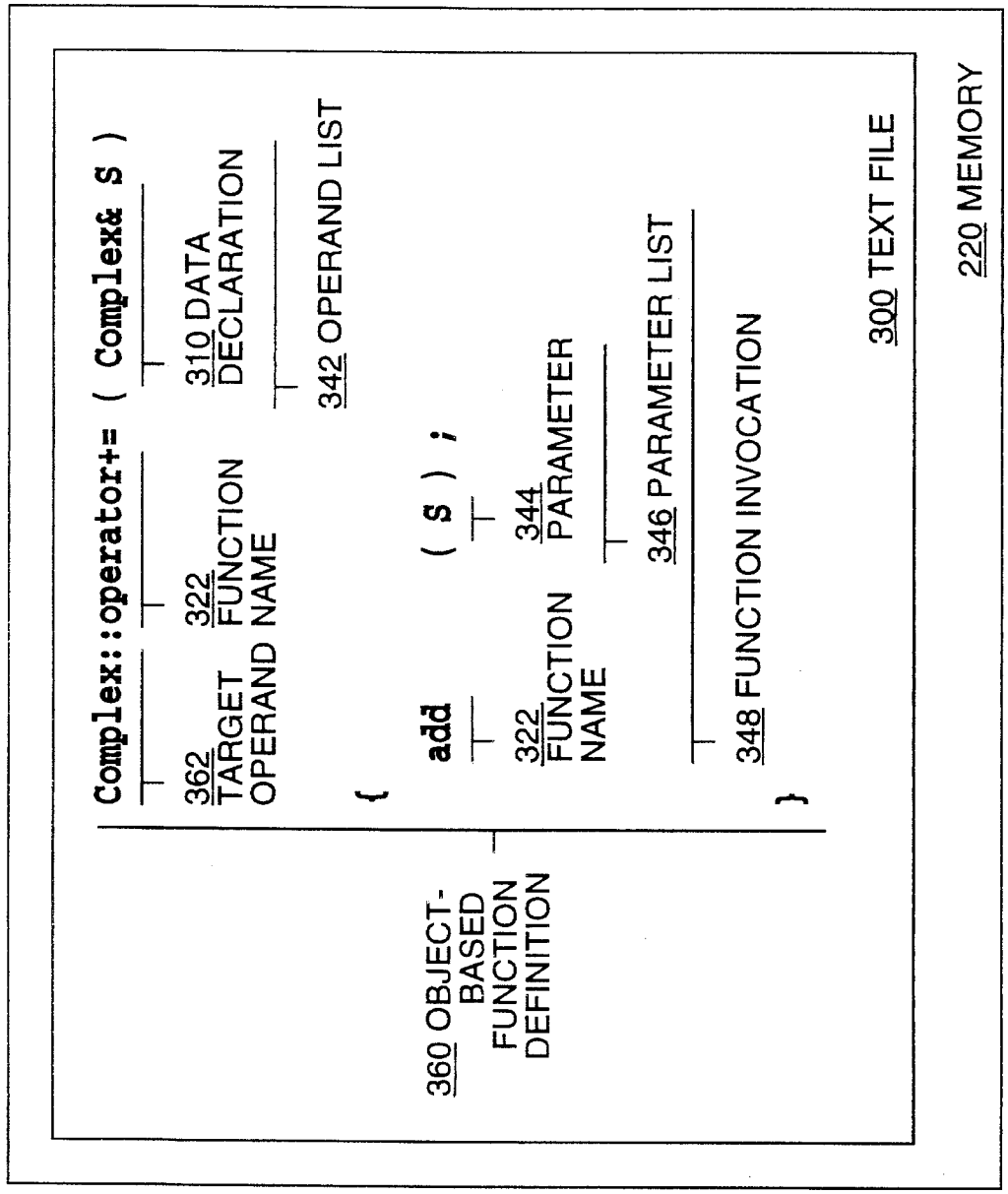
Figure 16:
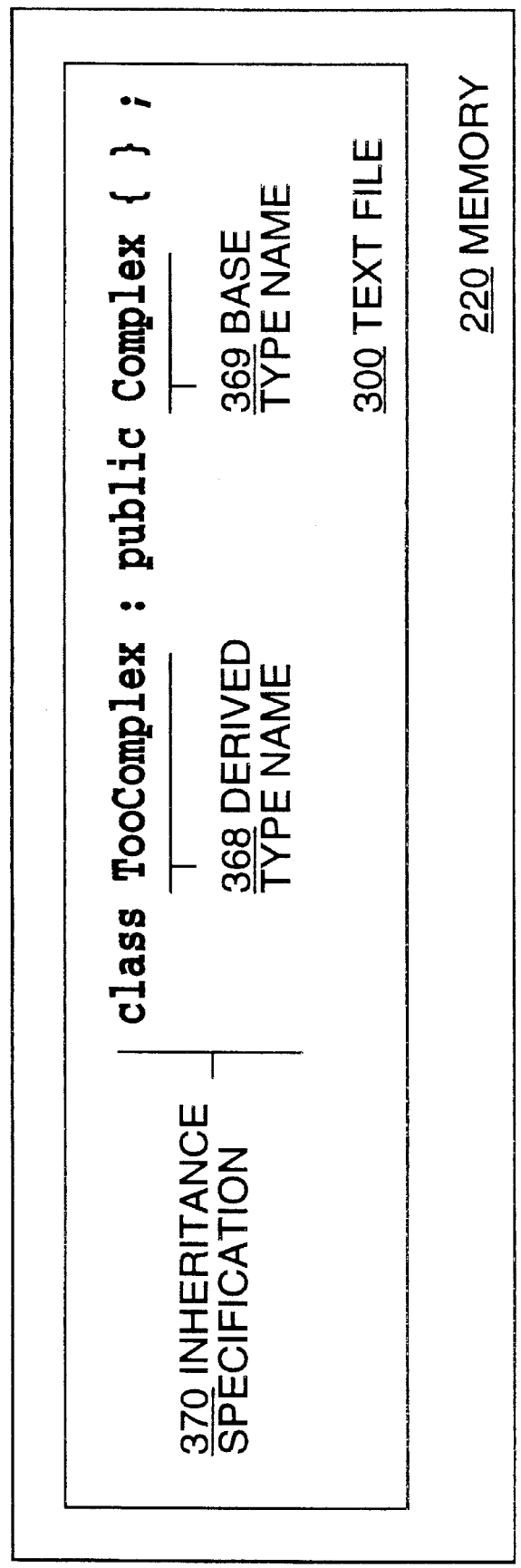
FIG. 16 represents the syntactical elements of inheritance in C++ source code. (PRIOR ART)
Figure 17:
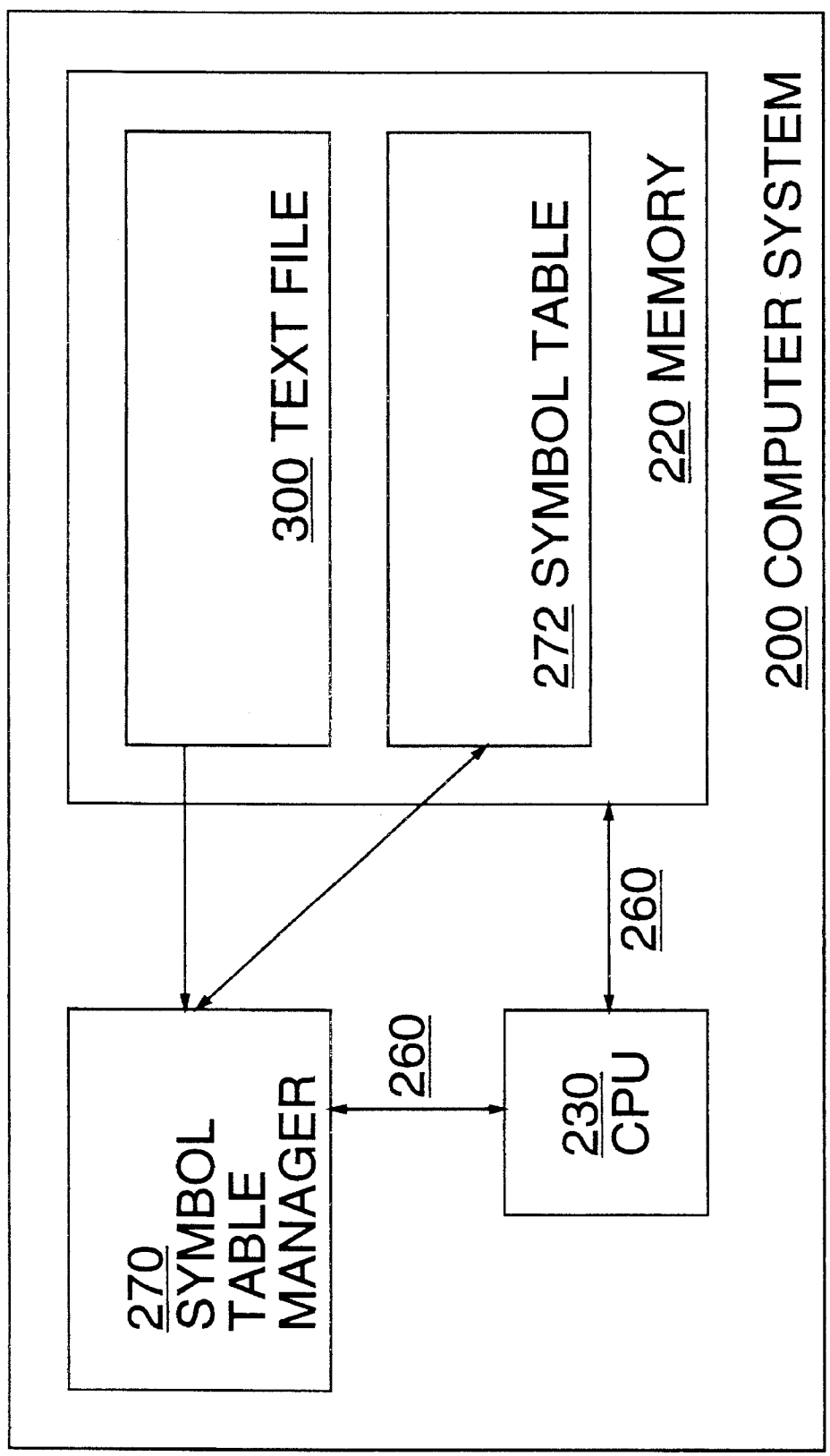
FIG. 17 represents compiler symbol table software. (PRIOR ART)

In the case that an invocation 348 is a copy (assignment) operation 349, then provided the other conditions for local reuse are met, the copy operation can be replaced by a copy-by-assumption operation. As shown in FIG. 12, the standard copy operation would end up copying the memory from the source 110 onto itself, and then attaching this memory to the target 160 (FIG. 12(a)). Since this copy is trivial, it may be eliminated without changing the behavior of the function (FIG. 12(b)).

6.3.3 Implementation

Given the above description of the behavior of subtype-based local reuse and the conditions which must be met for its use, it is now possible to state the steps of the method used in the preferred embodiment to translate a function definition which does not use subtype-based local reuse into one which does.

Algorithm 7.3.1—Subtype-Based Local Reuse
Step 1. Read the function definition.
Step 2. Assign subtypes to its temporary variables and return value.
Step 3. Generate the family of function definitions F.
Step 4. For each function definition $f$ in F,
  Step 4A. Translate $f$ into a form that reuses local memory wherever possible.
  Step 4B. Write out the modified $f$.

Algorithm 7.3.2—Assign Subtypes

Step 2 of Algorithm 7.3.1 can further be expanded as follows:
Step 1. Set the subtype of each temporary object declared within the function to Dcl or Other respectively, depending on whether the definition of the type of that operand is under user control.
Step 2. Set the subtype of the return value to Tmp or Other respectively, depending on whether the definition of the type of that operand is under user control.

Algorithm 7.3.3—Generate Subtyped Function Family

Step 3 of Algorithm 7.3.1 can further be expanded as follows:
Step 1. Place the function definition in the family of functions F.
Step 2. For each operand o in the function definition,
  Step 2A. If the definition of the type of this operand is under user control, replace each function $f$ in F with two function definitions in which the original type of o is replaced by that type augmented with the subtypes Dcl and Tmp respectively.
  Step 2B. Otherwise, replace each function definition $f$ in F by that $f$ in which the type of o is replaced by that type augmented with the subtype Other.

Algorithm 7.3.4—Translate Function Definition

Step 4A of Algorithm 7.3.1 can further be expanded as follows:
Step 1. Place any global or static variables accessed by this function $f$ into the local store L.
Step 2. Read the formal parameter list of $f$ and place its operands into the local store L.
Step 3. For each function invocation i in $f$,
  Step 3A. Translate i.

Algorithm 7.3.5—Translate Invocation

Step 3A of Algorithm 7.3.4 can further be expanded as follows:
Step 1. If this invocation i is an explicit allocation of new memory to a temporary t declared in $f$, delete it.
Step 2. For each operand o which is written to by invocation i,
  Step 2A. Rewrite i to allocate memory for o with reuse.

Algorithm 7.3.6—Allocate Memory With Reuse

Step 2A of Algorithm 7.3.5 can further be expanded as follows:
Step 1. If i 348 is a copy 349 operation and the source operand has the subtype Tmp, then use copy-by-assumption.
Step 2. Otherwise,
  Step 2A. Search the local store L for a Tmp object t which has been read (or has no readers) and is large enough to store o.
  Step 2B. If one or more such Tmp objects exists, select the smallest among these and allocate its memory to o.
  Step 2C. Otherwise, allocate new memory to o of size sufficient to hold o.

6.4 Combination of Copy-by-Reference and Local Reuse

As discussed above, the use of a subtype field enables the two memory reuse methods copy-by-reference and local reuse to coexist. Here, the combination of these two methods is described in detail.

It can be seen by reviewing the definition of each subtype and the restrictions placed upon objects of those subtypes by each method, that the subtypes defined are compatible. That is to say that the sets they define are mutually exclusive: Those of the Tmp subtype can own data and are known to have at most one reader; those of the Dcl subtype can own data and are not known to have at most one reader; those of the gel subtype cannot own data. Thus, the pair of subtypes from each method can be merged into a set of three subtypes in the combined method. It is only through the uniform application of the novel concept of ownership in these two methods that they become compatible.

Merging of the two procedures—which convert an ordinary function into one which uses subtypes for each type of memory reuse—is also straightforward. Local reuse modifies only objects of the Tmp and Dcl subtypes while copy-by-reference modifies only objects of the Ref subtype. This dichotomy allows the two methods to be combined without generating any new cases. Identical portions of the algorithms are merged into one, while the distinct portions are combined simply by listing the separate cases involving copy-by-reference and local reuse.

6.4.1 Implementation

Given the above conditions and their elaboration, the detailed specification for the preferred embodiment of the method of the present invention can now be stated.

Algorithm 7.4.1—Subtype-Based Memory Reuse

Step 1. Read the definition of the function.
Step 2. Assign subtypes to its temporary variables and return value.
Step 3. Generate the family of function definitions F.
Step 4. For each function definition $f$ in F,
  Step 4A. Translate $f$ into a form that best reuses local memory.
  Step 4B. Write out the modified $f$.

Algorithm 7.4.2—Assign Subtypes

Step 2 of Algorithm 7.4.1 can further be expanded as follows:
Step 1. For each temporary object t declared within the function,
  Step 1A. If the definition of the type of object t is under user control,
    Step 1Ai. If the a temporary is used as an alias (shallow copy) of another object, set its subtype to Ref.
    Step 1Aii. Otherwise, set its subtype to Dcl.
  Step 1B. Otherwise, set the subtype of this object to Other.
Step 2. If the definition of the type of the return value is under user control,
  Step 2A. If value semantics are to be used and this function is a destructive operation, make the return value a shallow copy of the target.
  Step 2B. If the return value is a shallow copy of another operand, set its subtype to Ref.
  Step 2C. Else, set the subtype of a nonvoid return value to Tmp.
Step 3. Otherwise, set the subtype of a nonvoid return value to Other.

Algorithm 7.4.3—Generate Subtyped Function Family

Step 3 of Algorithm 7.4.1 can further be expanded as follows:
Step 1. Place the function definition in the family of functions F.
Step 2. For each operand o in the function definition,
  Step 2A. If the definition of the type of o is under user control,
    Step 2Ai. If o is a constant operand, replace each function definition $f$ in F with that $f$ in which the type of o is replaced by that type augmented with the subtype Ref.
    Step 2Aii. Else, replace each function definition $f$ in F with three function definitions in which the type of o is replaced by that type augmented with the subtypes Ref, Dcl, and Tmp, respectively.
  Step 2B. Otherwise, replace each function definition $f$ in F with that $f$ in which the type of o is replaced by that type augmented with the subtype Other.

Algorithm 7.4.4—Translate Function Definition

Step 4A of Algorithm 7.4.1 can further be expanded as follows:
Step 1. If the target of function $f$ has the subtype Ref,
  Step 1A. If $f$ is a constructor which performs a deep copy of its argument(s), replace the deep copy with a shallow copy.
  Step 1B. If $f$ is a constructor which does not perform a deep copy of its argument(s), delete it and return.
  Step 1C. If $f$ is a destructor, remove any deallocations of external objects.
Step 2. Place any global or static variables accessed by this function $f$ into the local store L.
Step 3. Read the formal parameter list 342 of $f$ and place its operands into the local store L.
Step 4. For each function invocation i in $f$,
  Step 4A. Translate i.

Algorithm 7.4.5—Translate Function Invocation

Step 4A of Algorithm 7.4.4 can further be expanded as follows:
Step 1. If this invocation i 348 is an explicit allocation 372 of new memory 220 to a temporary t 310 declared in $f$ 340, delete it.
Step 2. For each operand o which is written to by invocation i,
  Step 2A. Rewrite i to allocate memory for o with reuse.

Algorithm 7.4.6—Allocate Memory with Reuse

Step 2A of Algorithm 7.4.5 can further be expanded as follows:
Step 1. If the subtype of output operand o is not Ref, then
  Step 1A. If i is a copy operation and the source operand has the subtype Tmp, then use copy-by-assumption.
  Step 1B. Otherwise,
    Step 1Bi. Search the local store L for a Tmp object which has been read (or has no readers) and which is large enough to store o.
    Step 1Bii. If one or more such Tmp objects exists, select the smallest among these and allocate its memory to o.
    Step 1Biii. Otherwise, allocate new memory to o of size sufficient to hold o.

6.5 Merging Cases Using Inheritance

According to the conditions under which local reuse can be utilized, memory can only be transferred from an object of the Tmp subtype to an object of the Tmp or Dcl subtypes. The cases to be considered can be summarized in the following table.

| Source →<br>↓ Destination | Ref | Dcl | Tmp |
|---|---|---|---|
| Ref | No | No | No |
| Dcl | No | No | Yes |
| Tmp | No | No | Yes |

As discussed above, inheritance allows the definition of one object type to be incorporated into another, and allows ancestor types 369 to refer to entire subtrees of derived types 368. The fact that the first two columns of the table are the same suggests that the Ref and Dcl types have some properties in common, while the fact that the last two rows of the table are the same suggests that the Dcl and Tmp types have some properties in common.

It is also the case that in a type hierarchy, inherited types usually have more detail (i.e. more data items) than their ancestors. Since a Ref object does not own memory, it can be created without including bookkeeping data related to memory allocation—thus making it simpler and more general than the other two subtypes. This suggests that the Ref subtype go at the top of the hierarchy. The Dcl type is then derived from the Ref type and the Tmp type is in turn derived from the Dcl type. A hierarchy is thus created in which a formal parameter of the Ref type can match actual parameters of the Dcl and Tmp types, and a formal parameter of the Dcl type can match an actual parameter of the Tmp type.

As Algorithm 7.4.2 is being applied, the following simplification can be made: All operands which are read-only can be summarized by two cases Tmp and non-Tmp. For all operands that are declared constant (read-only), the earlier 3 cases can be replaced with const Ref and Tmp. The Dcl case is absorbed by the Ref case through inheritance.

6.6 Extensions

In this subsection, extensions of the basic method are discussed. They represent refinements of the method presented herein, and should be obvious to a person skilled in the art.

Casts of Parameters to the Tmp Type

In the preferred embodiment, temporary variables 304 declared within $f$ function definition receive subtype Dcl (where subtyping is possible). To increase the effectiveness of the method in reusing memory, it is sometimes possible to inform the compiler that a temporary 350 has only one more reader, by explicitly casting it to the subtype Tmp. This will cause the memory of the temporary to become available for reuse.

Object-Code Implementation

The preferred embodiment is implemented in the source code of an object-oriented language. This means that the method cannot manipulate name pointers 13, and therefore operates at a depth of 1: Copying-by-reference amounts to a shallow copy, and local reuse can only reuse the external objects referenced by the object of interest.

However, one skilled in the art can see that the identical method can be implemented as part of a compiler 270. In this case, the method has access to the information contained in the compiler's symbol table 272, and can therefore manipulate name pointers 103. As a result, the method can operate at depth 0, creating abases and reusing objects in their entirety.

Multilevel Data Structures

Since the definition of an object is recursive, the manipulations which create and destroy them can also be applied recursively. The result is that, with this method in place, the same savings in memory through copy-by-reference and the same savings in CPU time through local reuse can be achieved by manipulations at every accessible level of reference in a multilevel data structure.

What is claimed is:

1. In a computer system having:

memory means;

means for allocating and deallocating objects comprising at least zero elements within said memory means;

means for creating and deleting identifiers comprising pointers to objects within said memory means;

means for retrieving an object given an identifier which points to said object;

a null identifier;

means for copying memory elements from one object to another object; and at least one process running in said computer system, a method for creating, reusing and destroying objects comprising the steps of:

(A) adding to said computer system means for labelling an identifier with a subtype; and then (B) in response to requests by ones of said processes to create a first object of a given size:

(i) searching said memory means for a first identifier which points to a smallest object at least as large as said given size, said first identifier being labelled with a first subtype; and then (ii) if said first identifier exists:

(a) creating a second identifier which points to said smallest object;

(b) deleting said first identifier by replacing it with said null identifier;

(c) labelling said second identifier with a second subtype; and then (d) returning said second identifier to said requesting process;

(iii) if said first identifier does not exist:

(a) allocating a second object at least as large as said given size;

(b) creating a third identifier which points to said second object;

(c) labelling said third identifier with said second subtype; and then (d) returning said third identifier to said requesting process;

(C) in response to requests by ones of said processes to create a reference copy of a first given object, said request comprising a fourth identifier which points to said first given object:

(i) creating a fifth identifier equal to said fourth identifier, and then (ii) labelling said fifth identifier with a third subtype, and then;

(iii) returning said fifth identifier to said requesting process;

(D) in response to requests by ones of said processes to create a verbatim copy of a second given object, said request comprising a sixth identifier which points to said second given object:

(i) requesting the creation of a third object at least as large as said second given object, and then;

(ii) for each element in said second given object: copying said element into said third object;

(iii) creating a seventh identifier which points to said third object;

(iv) labelling said seventh identifier with said first subtype; and then (v) returning said seventh identifier to said requesting process;

(E) in response to messages from ones of said processes indicating that a third given object will not be accessed again, said message comprising an eighth identifier which points to said third given object:

(i) labelling said eighth identifier with said first subtype; and (F) in response to requests by ones of said processes to destroy a fourth given object, said request comprising a ninth identifier which points to said fourth given object:

(i) if said ninth identifier is not said null identifier:

(a) if said ninth identifier is labelled with said first subtype or said second subtype: deallocating said fourth given object;

(b) deleting said ninth identifier.

2. In a computer system having means for representing source files, a method for rewriting a source file with respect to a given type name, said source file comprising a first plurality of at least zero types and a second plurality of at least zero function definitions, said method comprising the steps of:

(A) creating a first type name, a second type name and a third type name, said first type name being distinct from said second and third type names and said second type name being distinct from said third type name; and then (B) for each first type in said first plurality, said first type comprising a fourth type name, a third plurality of at least zero data declarations and a fourth plurality of at least zero function definitions:

(i) if said fourth type name matches said given type name:

(a) adding to said first plurality a second type, said second type comprising said first type name, a copy of said third plurality and a copy of said fourth plurality;

(b) adding to said first plurality a third type, said third type comprising said second type name, a copy of said third plurality and a copy of said fourth plurality;

(c) adding to said first plurality a fourth type, said fourth type comprising said third type name, a copy of said third plurality and a copy of said fourth plurality;

(d) removing from said first plurality said first type;

(C) for each first function definition in said second plurality, said first function definition comprising a function name, a first operand list, a fifth plurality of at least zero data declarations and a sixth plurality of at least zero function invocations, said first operand list comprising a seventh plurality of at least zero operands and said sixth plurality being an ordered set:

(i) for each first operand in said seventh plurality, said first operand comprising a fifth type name and a first object name, said fifth type name matching said given type name:

(a) adding to said second plurality a second function definition, said second function definition comprising said function name, a first copy of said seventh plurality, a copy of said fifth plurality and a copy of said sixth plurality;

(b) and then replacing said fifth type name in said first operand in said first copy of said seventh plurality with said first type name;

(c) adding to said second plurality a third function definition, said third function definition comprising said function name, a second copy of said seventh plurality, a copy of said fifth plurality and a copy of said sixth plurality;

(d) and then replacing said fifth type name in said first operand in said second copy of said seventh plurality with said second type name;

(e) adding to said second plurality a fourth function definition, said fourth function definition comprising said function name, a third copy of said seventh plurality, a copy of said fifth plurality and a copy of said sixth plurality;

(f) and then replacing said fifth type name in said first operand in said third copy of said seventh plurality with said third type name;

(g) if there is a first function invocation in said sixth plurality, said first function invocation changing finally a first object having said first object name, said first function invocation replacing said first object with a reference copy of a second object: removing from said second plurality said third and fourth function definitions;

(h) if said first function invocation does not exist and there is a second function invocation in said sixth plurality, said second function invocation replacing said first object with a third object: removing from said second plurality said second function definition;

(i) if said first operand is a first return value operand: removing from said second plurality said second and third function definitions;

(j) if there is a third function invocation in said sixth plurality, said third function invocation requesting the destruction of said first operand: removing from said second function definition said third function invocation;

(k) removing from said second plurality said first function definition;

(ii) for each first data declaration in said fifth plurality, said first data declaration comprising a sixth type name and a second object name, said sixth type name matching said given type name:

(a) replacing said sixth type name in said first data declaration with said second type name; and then (b) if only reference copies are ever assigned to said second object name: replacing said second type name in said first data declaration with said first type name;

(D) and then for each fifth function definition in said second plurality, said fifth function definition comprising a second operand list and an eighth plurality of at least zero function invocations, said second operand list comprising a ninth plurality of at least zero operands:

(i) if said eighth plurality contains an object creation request, said object creation request comprising a third object name, a seventh type name and a first given size, said seventh type name matching said given type name:

(a) if said ninth plurality contains a second operand, said second operand comprising an eighth type name and a third object name, said eighth type name matching said third type name, and there is a fourth object comprising a fourth object name and a first memory block 8, said fourth object name matching said third object name, said first memory block 8 having a size at least as large as said first given size: replacing said first object creation request with an assignment of said third object name to said second object name.

3. The method recited in claim 2 as implemented in a computer system which also has means for changing the type of an object, wherein step (D) is followed by:
- (E) and then for each sixth function definition in said second plurality, said sixth function definition comprising a third operand list, a tenth plurality of at least zero data declarations and an eleventh plurality of at least zero function invocations, said third operand list comprising a twelfth plurality of at least zero operands:
  - (i) for each third operand in said twelfth plurality, said third operand comprising a ninth type name and a fifth object name, said ninth type name matching said second type name:
    - (a) for each fourth function invocation in said eleventh plurality, said fourth function invocation comprising a first parameter list, said first parameter list comprising a thirteenth plurality of at least zero parameters such that said fifth object name matches a sixth object name in a first parameter in said thirteenth plurality:
      - (1) if said fifth object name does not appear in a second parameter in said thirteenth plurality and does not appear in a third parameter in a later fifth function invocation in said eleventh plurality and there are no reference copies of a fifth object having said fifth object name: adding to said sixth object name a type conversion specifying said third type name;
  - (ii) for each second data declaration in said tenth plurality, said second data declaration comprising a tenth type name and a seventh object name, said tenth type name matching said second type name:
    - (a) for each sixth function invocation in said eleventh plurality, said sixth function invocation comprising a second parameter list, said second parameter list comprising a fourteenth plurality of at least zero parameters such that said seventh object name matches an eighth object name in a fourth parameter in said fourteenth plurality:
      - (1) if said seventh object name does not appear in a fifth parameter in said fourteenth plurality and does not appear in a sixth parameter in a later seventh function invocation in said eleventh plurality and there are no reference copies of a sixth object having said seventh object name: adding to said eighth object name a type conversion specifying said third type name.

4. The method recited in claim 2 as implemented in a computer system which also has:
   means for designating at most one operand as a target operand,
   wherein step (C(i(g))) is preceded by:
   - (f1) if said first operand is a target operand and said first function definition has no return value operand:
     - (1) adding to said second, third and fourth function definitions a second return value operand having said name of said second type;
     - (2) adding to said second and third function definitions function invocations which place a reference copy of said target operand in said second return value operand.

5. The method recited in claim 2 as implemented in a computer system also having:
   means for inheriting an eleventh type name from a twelfth type name, said inheritance means copying all data declarations and function definitions from a fifth type having said twelfth type name into a sixth type having said eleventh type name;
   wherein step (B(i(d))) is followed by:
   - (e) inheriting said second type name from said first type name; and then
   - (f) deleting from said third type all data declarations and function definitions which are duplicates of those in said second type;
   and step (C(i(i))) ) is followed by:
   - (i1) if no assignment is made to said first object name: deleting said third function definition.

6. The method recited in claim 2 as implemented in a computer system also having:
   means for inheriting a thirteenth type name from a fourteenth type name, said inheritance means copying all data declarations and function declarations from a seventh type having said fourteenth type name into an eighth type having said thirteenth type name;
   wherein step (B(i(c))) is followed by:
   - (f) inheriting said third type name from said second type name; and then
   - (g) deleting from said fourth type all data declarations and function definitions which are duplicates of those in said third type;
   and step (D) is followed by:
   - (F) for each seventh function definition in said second plurality, said seventh function definition comprising a fourth operand list, said fourth operand list comprising a fifteenth plurality of at least zero operands:
     - (i) for each fourth operand, said fourth operand comprising a fifteenth type name and a ninth object name, said fifteenth type name matching said third type name:
       - (a) if said ninth object name does not appear in a copy-by-assumption operation in said seventh function definition: deleting said seventh function definition.

7. The method recited in claim 2, wherein step (D) is followed by:
   - (G) and then for each eighth function definition, said eighth function definition comprising a fifth operand list, a sixteenth plurality of at least zero data declarations and a seventeenth plurality of at least zero function invocations, said tenth operand list comprising an eighteenth plurality of at least zero operands:
     - (i) for each fifth operand in said eighteenth plurality, said fifth operand comprising a sixteenth type name and a tenth object name, said sixteenth type name matching said given type name:
       - (a) if said eighth function definition contains a nineteenth plurality of function invocations, said nineteenth plurality copying each first element of a seventh object having said tenth object name from a first memory location into said first memory location: deleting from said eighth function definition said nineteenth plurality;
     - (ii) for each third data declaration in said seventeenth plurality, said third data declaration comprising a seventeenth type name and an eleventh object name, said seventeenth type name matching said given type name:
       - (a) if said eighth function definition contains a twentieth plurality of function invocations, said twentieth plurality copying each second element of an eighth object having said eleventh object name from a second memory location into said second memory location: deleting from said eighth function definition said twentieth plurality.

8. In a computer system having:
   memory means;
   means for allocating and deallocating objects comprising at least zero elements within said memory means;
   means for creating and deleting identifiers comprising pointers to objects within said memory means;

means for retrieving an object given an identifier which points to said object;

a null identifier;

means for copying memory elements from one object to another object; and at least one process running in said computer system, a method for creating, reusing and destroying objects comprising the steps of:

(A) adding to said computer system means for labelling an identifier with a subtype; and then (B) in response to requests by ones of said processes to create a first object of a given size:

(i) allocating a second object at least as large as said given size;

(ii) creating a first identifier which points to said second object;

(iii) labelling said first identifier with a first subtype; and then (iv) returning said first identifier to said requesting process;

(C) in response to requests by ones of said processes to create a reference copy of a first given object, said request comprising a second identifier which points to said first given object:

(i) creating a third identifier equal to said second identifier, and then (ii) labelling said third identifier with a second subtype, and then;

(iii) returning said third identifier to said requesting process;

(D) in response to requests by ones of said processes to create a verbatim copy of a second given object, said request comprising a fourth identifier which points to said second given object:

(i) requesting the creation of a third object at least as large as said second given object, and then;

(ii) for each element in said second given object: copying said element into said third object;

(iii) creating a fifth identifier which points to said third object;

(iv) labelling said fifth identifier with said first subtype; and then (v) returning said fifth identifier to said requesting process;

(E) in response to requests by ones of said processes to destroy a third given object, said request comprising a sixth identifier which points to said third given object:

(i) if said sixth identifier is not said null identifier:

(a) if said sixth identifier is labelled with said first subtype: deallocating said third given object;

(b) deleting said sixth identifier.

9. In a computer system having:

means for representing source files;

a method for rewriting a source file with respect to a given type name, said source file comprising a first plurality of at least zero types and a second plurality of at least zero function definitions, said method comprising the steps of:

(A) creating a first type name and a second type name, said first type name being distinct from said second type name; and then (B) for each first type in said first plurality, said first type comprising a third type name, a third plurality of at least zero data declarations and a fourth plurality of at least zero function definitions:

(i) if said third type name matches said given type name:

(a) adding to said first plurality a second type, said second type comprising said first type name, a copy of said third plurality and a copy of said fourth plurality;

(b) adding to said first plurality a third type, said third type comprising said second type name, a copy of said third plurality and a copy of said fourth plurality;

(c) removing from said first plurality said first type;

(C) for each first function definition in said second plurality, said first function definition comprising a function name, an operand list, a fifth plurality of at least zero data declarations and a sixth plurality of at least zero function invocations, said operand list comprising a seventh plurality of at least zero operands and said sixth plurality being an ordered set:

(i) for each operand in said seventh plurality, said operand comprising a fourth type name and a first object name, said fourth type name matching said given type name:

(a) adding to said second plurality a second function definition, said second function definition comprising said function name, a first copy of said seventh plurality, a copy of said fifth plurality and a copy of said sixth plurality;

(b) and then replacing said fourth type name in said operand in said first copy of said seventh plurality with said first type name;

(c) adding to said second plurality a third function definition, said third function definition comprising said function name, a second copy of said seventh plurality, a copy of said fifth plurality and a copy of said sixth plurality;

(d) and then replacing said fourth type name in said first operand in said second copy of said seventh plurality with said second type name;

(e) if there is a first function invocation in said sixth plurality, said first function invocation changing finally a first object having said first object name, said first function invocation replacing said first object with a reference copy of a second object: removing from said second plurality said third function definition;

(f) if said first function invocation does not exist and there is a second function invocation in said sixth plurality, said second function invocation replacing said first object with a third object: removing from said second plurality said second function definition;

(g) if there is a third function invocation in said sixth plurality, said third function invocation requesting the destruction of said operand: removing from said second function definition said third function invocation;

(h) removing from said second plurality said first function definition;

(ii) for each data declaration in said fifth plurality, said data declaration comprising a fifth type name and a second object name, said fifth type name matching said given type name:

(a) replacing said fifth type name in said data declaration with said second type name; and then (b) if only reference copies are ever assigned to said second object name: replacing said second type name in said data declaration with said first type name.

10. The method recited in claim 9 as implemented in a computer system also having means for inheriting a sixth type name from a seventh type name, said inheritance means copying all data declarations and function definitions from a fourth type having said seventh type name into a fifth type having said sixth type name, wherein step (B(i(c))) is followed by:

(d) inheriting said second type name from said first type name; and then (e) deleting from said third type all data declarations and function definitions which are duplicates of those in said second type;

and step (C(i(f))) is followed by:

(f1) if no assignment is made to said first object name: deleting said third function definition.

11. The method recited in claim 9 as implemented in a computer system which also has means for designating at most one operand as a target operand, wherein step (C(i(e))) is preceded by:

(d1) if said operand is a target operand and said first function definition has no return value operand:

(1) adding to said second and third function definitions a return value operand having said name of said second type;

(2) adding to said second and third function definitions function invocations which place a reference copy of said target operand in said return value operand.

12. In a computer system having:

memory means;

means for allocating and deallocating objects comprising at least zero elements within said memory means;

means for creating and deleting identifiers comprising pointers to objects within said memory means;

means for retrieving an object given an identifier which points to said object;

a null identifier; and at least one process running in said computer system, a method for creating, reusing and destroying objects comprising steps of:

(A) adding to said computer system means for labelling an identifier with a subtype; and then (B) in response to requests by ones of said processes to create a first object of a given size:

(i) searching said memory means for a first identifier which points to a smallest object at least as large as said given size, said first identifier being labelled with a first subtype; and then (ii) if said first identifier exists:

(a) creating a second identifier which points to said smallest object;

(b) deleting said first identifier by replacing it with said null identifier;

(c) labelling said second identifier with a second subtype; and then (d) returning said second identifier to said requesting process;

(iii) if said first identifier does not exist:

(a) allocating a second object at least as large as said given size;

(b) creating a third identifier which points to said second object;

(c) labelling said third identifier with said second subtype; and then (d) returning said third identifier to said requesting process;

(C) in response to messages from ones of said processes indicating that a first given object will not be accessed again, said message comprising a fourth identifier which points to said first given object:

(i) labelling said fourth identifier with said first subtype; and (D) in response to requests by ones of said processes to destroy a second given object, said request comprising a fifth identifier which points to said second given object 1:

(i) if said fifth identifier is not said null identifier:

(a) deallocating said second given object and (b) deleting said fifth identifier.

13. In a computer system having means for representing source files, a method for rewriting a source file with respect to a given type name, said source file comprising a first plurality of at least zero types and a second plurality of at least zero function definitions, said method comprising the steps of:

(A) creating a first type name and a second type name, said first type name being distinct from said second type name; and then (B) for each first type in said first plurality, said first type comprising a third type name, a third plurality of at least zero data declarations and a fourth plurality of at least zero function definitions:

(i) if said third type name matches said given type name:

(a) adding to said first plurality a second type, said second type comprising said first type name, a copy of said third plurality and a copy of said fourth plurality;

(b) adding to said first plurality a third type, said third type comprising said second type name, a copy of said third plurality and a copy of said fourth plurality;

(c) removing from said first plurality said first type;

(C) for each first function definition in said second plurality, said first function definition comprising a function name, a first operand list, a fifth plurality of at least zero data declarations and a sixth plurality of at least zero function invocations, said first operand list comprising a seventh plurality of at least zero operands and said sixth plurality being an ordered set:

(i) for each first operand in said seventh plurality, said first operand comprising a fourth type name and a first object name, said fourth type name matching said given type name:

(a) adding to said second plurality a second function definition, said second function definition comprising said function name, a first copy of said seventh plurality, a copy of said fifth plurality and a copy of said sixth plurality;

(b) and then replacing said fifth type name in said first operand in said first copy of said seventh plurality with said first type name;

(c) adding to said second plurality a third function definition, said third function definition comprising said function name, a second copy of said seventh plurality, a copy of said fifth plurality and a copy of said sixth plurality;

(d) and then replacing said fifth type name in said first operand in said second copy of said seventh plurality with said second type name;

(e) if said first operand is a return value operand: removing from said second plurality said second function definition;

(f) removing from said second plurality said first function definition;

(ii) for each first data declaration in said fifth plurality, said first data declaration comprising a fifth type name and a second object name, said fifth type name matching said given type name:

(a) replacing said fifth type name in said first data declaration with said second type name; and then (D) and then for each fourth function definition in said second plurality, said fourth function definition comprising a second operand list and an eighth plurality of at least zero function invocations, said second operand list comprising a ninth plurality of at least zero operands:

(i) if said eighth plurality contains an object creation request, said object creation request comprising a third object name, a sixth type name and a given size, said sixth type name matching said given type name:

(a) if said ninth plurality contains a second operand, said second operand comprising a seventh type name and a fourth object name, said seventh type name matching said third type name, and there is a first object comprising a fifth object name and a first memory block 8, said fifth object name matching said fourth object name, said first memory block 8 having a size at least as large as said given size: replacing said first object creation request with an assignment of said third object name to said second object name.

14. The method recited in claim 13 as implemented in a computer system also having means for inheriting an eighth type name from a ninth type name, said inheritance means copying all data declarations and function definitions from a fourth type having said ninth type name into a fifth type having said eighth type name, wherein step (B(i(c))) is followed by:

(d) inheriting said second type name from said first type name; and then (e) deleting from said third type all data declarations and function definitions which are duplicates of those in said second type;

and step (D) is followed by:

(E) for each fifth function definition in said second plurality, said fifth function definition comprising a third operand list, said third operand list comprising a tenth plurality of at least zero operands:

(i) for each third operand in said tenth plurality, said third operand comprising a tenth type name and a fifth object name, said tenth type name matching said third type name:

(a) if said fifth object name does not appear in a copy-by-assumption operation in said fifth function definition: removing from said second plurality said fifth function definition.

15. The method recited in claim 13, wherein step (D) is followed by:

(F) and then for each sixth function definition, said sixth function definition comprising a fourth operand list, an eleventh plurality of at least zero data declarations and a twelfth plurality of at least zero function invocations, said fourth operand list comprising a thirteenth plurality of at least zero operands:

(i) for each fourth operand in said thirteenth plurality, said fourth operand comprising an eleventh type name and a sixth object name, said eleventh type name matching said given type name:

(a) if said sixth function definition contains a fourteenth plurality of function invocations, said fourteenth plurality copying each first element of a second object having said sixth object name from a first memory location into said first memory location: deleting from said sixth function definition said fourteenth plurality;

(ii) for each second data declaration in said twelfth plurality, said second data declaration comprising a twelfth type name and a seventh object name, said twelfth type name matching said given type name:

(a) if said sixth function definition contains a fifteenth plurality of function invocations, said fifteenth plurality copying each second element of a third object having said seventh object name from a second memory location into said second memory location: deleting from said sixth function definition said fifteenth plurality.

16. The method recited in claim 13 as implemented in a computer system which also has means for changing the type of an object, wherein step (D) is followed by:

(F) and then for each seventh function definition in said second plurality, said seventh function definition comprising a fifth operand list, a sixteenth plurality of at least zero data declarations and a seventeenth plurality of at least zero function invocations, said fifth operand list comprising an eighteenth plurality of at least zero operands:

(i) for each fifth operand in said eighteenth plurality, said fifth operand comprising a thirteenth type name and a eighth object name, said thirteenth type name matching said second type name:

(a) for each first function invocation in said seventeenth plurality, said first function invocation comprising a first parameter list, said first parameter list comprising a nineteenth plurality of at least zero parameters such that said eighth object name matches a ninth object name in a first parameter in said nineteenth plurality:

(1) if said eighth object name does not appear in a second parameter in said nineteenth plurality and does not appear in a third parameter in a later second function invocation in said seventeenth plurality and there are no reference copies of a fourth object having said eighth object name: adding to said ninth object name a type conversion specifying said second type name;

(ii) for each third data declaration in said sixteenth plurality, said third data declaration comprising a fourteenth type name and a tenth object name, said fourteenth type name matching said second type name:

(a) for each third function invocation in said seventeenth plurality, said third function invocation comprising a second parameter list, said second parameter list comprising a twentieth plurality of at least zero parameters such that said tenth object name matches an eleventh object name in a fourth parameter in said twentieth plurality:

(1) if said tenth object name does not appear in a fifth parameter in said twentieth plurality and does not appear in a sixth parameter in a later fourth function invocation in said seventeenth plurality and there are no reference copies of a fifth object having said tenth object name: adding to said eleventh object name a type conversion specifying said second type name.

17. In a computer system having:

memory means;

means for allocating and deallocating objects comprising at least zero elements within said memory means;

means for creating and deleting identifiers comprising pointers to objects within said memory means;

means for retrieving an object given an identifier which points to said object;

a null identifier; and at least one process running in said computer system, a method for creating, reusing and destroying objects comprising the steps of:

(A) adding to said computer system means for creating and maintaining a set 2 of identifiers comprising means for adding and deleting identifiers and means for finding identifiers within said identifier set means, said identifiers meeting specific size requirements; and then (B) in response to requests by ones of said processes to create a first object of a given size:

(i) searching said identifier set means for a first identifier which points to a smallest object at least as large as said given size; and then (ii) if said first identifier exists:

(a) creating a second identifier equal to said first identifier;

(b) deleting from said identifier set means said first identifier by replacing it with said null identifier; and then (c) returning said second identifier to said requesting process;

(iii) if said first identifier does not exist:

(a) allocating a second object at least as large as said given size;

(b) creating a third identifier which points to said second object; and then (c) returning said third identifier to said requesting process;

(C) in response to messages from ones of said processes indicating that a first given object will not be accessed again, said message comprising a fourth identifier which points to said first given object:

(i) creating a fifth identifier equal to said fourth identifier;

(ii) adding said fifth identifier to said identifier set means;

(iii) deleting said fourth identifier by replacing it with said null identifier;

(D) in response to requests by ones of said processes to destroy a second given object, said request comprising a sixth identifier which points to said second given object:

(i) if said sixth identifier is not said null identifier:

(a) deallocating said second given object and (b) deleting said sixth identifier.

* * * * *